(12) United States Patent
Kolych et al.

(10) Patent No.: US 11,958,321 B2
(45) Date of Patent: Apr. 16, 2024

(54) RECEIVED SIGNAL STRENGTH INDICATOR (RSSI) SIGNATURE FOR TIRE LOCALIZATION

(71) Applicant: Cypress Semiconductor Corporation, San Jose, CA (US)

(72) Inventors: Igor Kolych, Lviv (UA); Victor Simileysky, San Jose, CA (US); Kiran Uln, Pleasanton, CA (US); Michael Kandler, Sauerlach (DE)

(73) Assignee: Cypress Semiconductor Corporation, San Jose, CA (US)

( * ) Notice: Subject to any disclaimer, the term of this patent is extended or adjusted under 35 U.S.C. 154(b) by 65 days.

(21) Appl. No.: 17/890,170

(22) Filed: Aug. 17, 2022

(65) Prior Publication Data

US 2024/0059107 A1 Feb. 22, 2024

(51) Int. Cl.
*B60C 23/04* (2006.01)
*B60C 23/00* (2006.01)
(Continued)

(52) U.S. Cl.
CPC .......... *B60C 23/0437* (2013.01); *B60C 23/00* (2013.01); *B60C 23/0416* (2013.01);
(Continued)

(58) Field of Classification Search
CPC ........ G01S 5/02; G01S 5/0268; G01S 5/0284; G01S 13/75; H04B 7/024; H04B 7/0413;
(Continued)

(56) References Cited

U.S. PATENT DOCUMENTS 7,230,525 B2 6/2007 Hirai
10,750,395 B2 * 8/2020 Zhou ................... H04B 7/0632
(Continued)

FOREIGN PATENT DOCUMENTS

EP 1616723 A1 1/2006
EP 2537689 A1 12/2012
(Continued)

OTHER PUBLICATIONS

NPL Search (Dec. 10, 2023).*

*Primary Examiner* — Van T Trieu

(57) ABSTRACT

Techniques are described for using one or more wireless host devices to perform tire localization of TPMS sensor data by determining received signal strength indicator (RSSI) signatures that are unique to the wireless communication channel between a host device and each TPMS sensor. RSSI signatures represents a periodic variation of the wireless communication channel between a host device on the car body and a TPMS sensor in a rotating tire. Characteristics of the communication channel is a function of the wheel angle and is periodic with wheel rotations. The RSSI signatures may be created by matching RSSI measurements of packets received by the host device from a TPMS sensor with wheel angles derived from wheel speed sensor (WSS) data of the anti-lock braking system (ABS). The RSSI signatures are a unique marker of each wheel that may be used to identify the locations of the TPMS sensors for tire localization.

20 Claims, 14 Drawing Sheets

(51) Int. Cl.
*H04B 17/318* (2015.01)
*G01S 5/02* (2010.01)

(52) U.S. Cl.
CPC ........ *B60C 23/045* (2013.01); *B60C 23/0488* (2013.01); *B60C 23/0489* (2013.01); *H04B 17/318* (2015.01); *G01S 5/02* (2013.01)

(58) Field of Classification Search
CPC ...... H04B 7/15; H04B 7/155; H04B 7/15514; H04B 7/165; H04B 7/204; H04B 7/2041; B60C 23/04; B60C 23/0416; B60C 23/0437; B60C 23/0488; B60C 23/0489; G06Q 10/08; G06Q 10/0875
See application file for complete search history.

(56) References Cited

U.S. PATENT DOCUMENTS

| | | | |
|---|---|---|---|
| 10,839,627 B2* | 11/2020 | Golsch | G07C 9/28 |
| 2017/0103101 A1* | 4/2017 | Mason | G06F 16/2365 |
| 2020/0346500 A1* | 11/2020 | Zeng | B60C 23/0462 |
| 2022/0187412 A1* | 6/2022 | Nakajima | H04W 4/029 |

FOREIGN PATENT DOCUMENTS

| | | | |
|---|---|---|---|
| JP | 2013001219 A | 1/2013 |
| WO | 2011038033 A1 | 3/2011 |
| WO | 2012031655 A1 | 3/2012 |

* cited by examiner

{ US 11,958,321 B2 }

RECEIVED SIGNAL STRENGTH INDICATOR (RSSI) SIGNATURE FOR TIRE LOCALIZATION

TECHNICAL FIELD

This disclosure generally relates to technologies for determining locations of wireless sensors, and more particularly, to techniques for tire localization of sensors in vehicle tire pressure monitoring system (TPMS) applications using narrow-band radios such as Bluetooth technologies.

BACKGROUND

TPMS has become a required safety feature of modern vehicles. Sensors in tires such as pressure and temperature sensors measure operating conditions of the tires and wirelessly transmit sensor data to a host controller of the TPMS. Tire localization allows the host controller of the TPMS to determine which wheel(s) of the vehicle experiences critical events such as low pressure, high temperature, etc., based on the sensor data and to inform a driver of the critical events. A safety assistance feature of the TPMS or the driver may then take corrective measures to address the critical events. It is desirable to perform tire localization before, or at the beginning of, each drive. This is because positions of tires may change, as tires are recommended to be periodically rotated to maintain even treadwear, and frequently assignment of tires to wheels may be skipped during the service.

Tire localization may be performed using two different approaches. A first approach uses data from the anti-lock braking system (ABS) and an accelerometer placed inside the TPMS sensor. The accelerometer may measure an angular velocity of the tire. The number of wheel rotations in a time interval may be extracted from ABS data, which may identify the wheel associated with the ABS data, as well as from measurements made by the accelerometers in the TPMS sensor of a tire. Because of small differences in the rotational rate of the wheels, rotational data derived from the ABS data of the wheels may be matched with the rotational data derived from the accelerometers of the tires to perform tire localization. However, this approach requires an accelerometer to be placed in each TPMS sensor, increasing the cost and power consumption of the TPMS sensor.

A second approach for performing tire localization places a wireless host device on the vehicle close to each TPMS sensor to receive TPMS sensor data. The wireless host device may measure signal strength of TPMS sensor data communication from different TPMS sensors to determine the wheel locations of the various TPMS sensors. However, this approach requires more than one wireless host device, such as a host device for each TPMS sensor, to differentiate between the levels of signal strength from different wheels. In addition to the increased cost, the approach is also susceptible to varying environmental conditions because the solution relies on measuring and comparing the signal strength of the communication received by a host device from different TPMS sensors. As such, there is a need to improve the cost, performance, and reliability of tire localization in TPMS applications to ensure the safe operation of vehicles.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
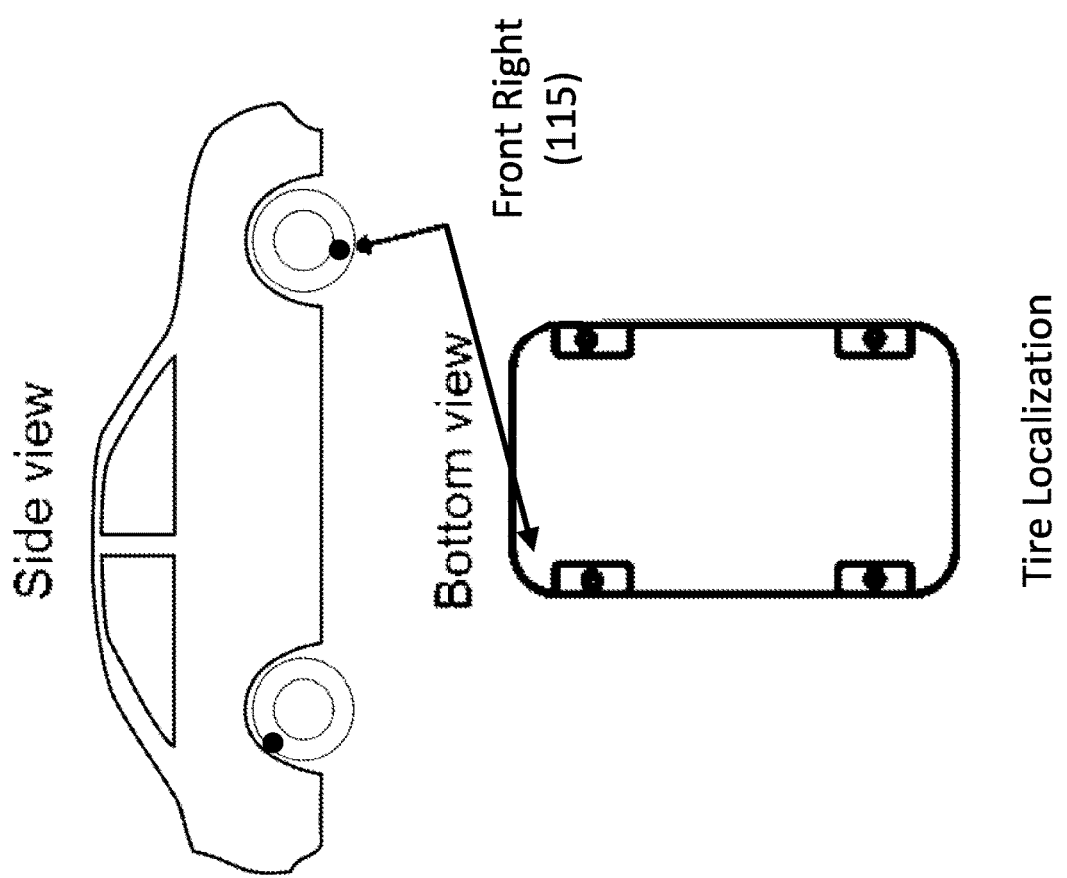
FIG. 1 is a diagram illustrating tire localization in which TPMS sensor data from a tire is localized to the front right wheel of a vehicle, in accordance with one aspect of the present disclosure.

Examples of various aspects and variations of the subject technology are described herein and illustrated in the accompanying drawings. The following description is not intended to limit the invention to these embodiments, but rather to enable a person skilled in the art to make and use this invention.

Described are systems and methods for using a single (or multiple) wireless host device(s) to perform tire localization of TPMS sensor data by determining received signal strength indicator (RSSI) signatures that are unique to the wireless communication channel between a host device and each TPMS sensor. RSSI signatures represents a periodic variation of the wireless communication channel between a host device on the car body and a TPMS sensor in a rotating tire. Characteristics of the communication channel is a function of the wheel angle (e.g., angle of the wheel relative to the car body) and is thus periodic with wheel rotations. In one aspect, the RSSI signatures may be created by matching RSSI measurements of packets received by the host device from a TPMS sensor with wheel angles derived from wheel speed sensor (WSS) data of the anti-lock braking system (ABS). Due to the asymmetry of the antenna of the host device on the car body with respect to the antenna of each TPMS sensor, the RSSI signatures are a unique marker of each wheel that may be used to identify the locations of the TPMS sensors for tire localization. In one aspect, an autocorrelation of the RSSI measurements of packets received by the host device from a TPMS sensor with a period of the wheel rotation given by the WSS data of each wheel may be used to identify the location of the TPMS sensor for tire localization. The autocorrelation may also represent a unique signature for associating the TPMS sensor with a wheel. TPMS communication may use narrow-band radios such as Bluetooth Low Energy (BLE), IEEE 802.15.4, IEEE 802.11, or other short-range narrow-band radio technologies (including high frequencies (HF) radio which is currently used to receive TPMS data).

Communication events between a TPMS sensor and a host device occur randomly in time and are therefore independent of, and unsynchronized with, the rotation of the tire embedding the TPMS sensor. As a result, the host device may receive data packets from multiple TPMS sensors with unknown wheel angles. However, characteristics of the communication channel with a TPMS sensor depend on the wheel angle positions of the tire embedding the TPMS sensor. In one aspect, to obtain the RSSI signature of the TPMS sensor as a function of wheel angles, the host device may estimate the wheel angle corresponding to the RSSI measurement of a data packet received from the TPMS sensor by leveraging information provided by the ABS. The host device may use the ABS WSS data of a wheel to estimate the wheel angle corresponding to a data packet based on the time of reception of the data packet. The host device may generate the RSSI signature for a TPMS sensor by pairing a collection of RSSI measurements of data packets from the TPMS sensor with the wheel angles estimated for the corresponding data packets for a wheel. In the case of multiple wireless host devices, each host device may independently generate the RSSI signatures based on the RSSI measurements of data packets from the TPMS sensors received by each host device, although the wheel angle estimates corresponding to the data packets may be shared among multiple host devices. In one aspect, the host device may auto-correlate the RSSI measurements of data packets from the TPMS sensor where the RSSI measurements used for the autocorrelation function are separated by a hypothetical measurement of the wheel rotation period determined from the WSS data for a wheel. For example, the RSSI measurements of a first rotation period of the wheel may be multiplied with the RSSI measurements of a second (subsequent) rotation period of the same wheel and the product is integrated to generate the autocorrelation. In one aspect, the autocorrelation may be integrated over multiple rotation periods of the wheel. The highest value of the autocorrelation function is expected if the hypothetical wheel rotation period for a wheel matches the period of the RSSI measurements, indicating that the RSSI measurements and the wheel are correctly paired.

The WSS data is generated by the ABS for each wheel. Since the host device is performing tire localization of the TPMS sensors and does not yet know the pairings between the TPMS sensors and the wheels, the host device may generate the RSSI signatures for all possible pairings of RSSI measurements from a TPMS sensor with the estimated wheel angles for each wheel. If the number of TPMS sensors N is the same as the number of wheels, the total number of RSSI signatures generated for all possible pairings of RSSI measurements from N TPMS sensors with the wheel angles from N wheels is $N^2$. When the RSSI signature represents a correct pairing of a TPMS sensor and a wheel, the pairings of the RSSI measurements and the wheel angles may exhibit identifiable periodic variations over the 360° revolution of a wheel because the RSSI measurements are a function of the wheel angles. On the other hand, when a TPMS sensor is incorrectly paired with a wheel, the RSSI signature may not exhibit identifiable characteristics because the RSSI measurements have been paired with random wheel angles from another wheel. The host device may thus use the RSSI signatures to perform tire localization.

In one aspect, the host device may calculate a metric based on the RSSI signatures to determine the correct pairings of the TPMS sensors and wheels. The metrics may be based on the noise level of the RSSI signatures. The host device may calculate the noise variance of the RSSI signature over the 360° range of wheel angles. The RSSI signatures for correctly paired TPMS sensor-wheel tends to exhibit low noise variance. The RSSI signatures for incorrectly paired TPMS sensor-wheel may have large noise variance as expected in a random process. The host device may sum the noise variance for N pairings of TPMS sensor-wheel to calculate the summed noise variance for this particular combination of N TPMS sensors with N wheels. The host device may determine the result of tire localization by finding the minimum summed noise variance among all possible combinations of N pairings of TPMS sensors with N wheels. In one aspect, the search space representing all possible combinations of N pairings of TPMS sensors with N wheels may be N! (N factorial). In case of several host devices, the number of possible combinations is the same, but noise variance for N pairings of TPMS sensor-wheel may be summed for all hosts because of independent channels for each host.

In one aspect, the host device may determine if there is a distinct minimum in the summed noise variance of N pairings of TPMS sensor-wheel in the search space. For example, the host device may determine a normalized difference between the two smallest summed noise variance of N pairings of TPMS sensor-wheel in the search space. If the normalized difference is greater than a threshold, sufficient confidence in the result of tire localization may be declared. Otherwise, the host device may collect additional RSSI measurements until sufficient confidence in the correct N pairings of TPMS sensor-wheel is attained.

In one aspect, the host device may determine the RSSI signatures at the beginning of a drive. The host device may store the RSSI signatures of the current drive for use at the next drive to reduce the number of RSSI measurements for tire localization for the next drive. For example, the host device may use the stored RSSI signature for a TPMS sensor-wheel pairing from a previous drive as a RSSI signature template at the start of the current drive. The host device may collect RSSI measurements of data packets from the TPMS sensor and estimate wheel angles of the data packets for the wheel corresponding to the TPMS sensor-wheel pairing of the RSSI signature template to update the RSSI signature template. If the updated RSSI signature template does not achieve sufficient confidence level in the result, the host device may extract new RSSI signature based only on RSSI measurements collected and wheel angles estimated during the current drive. In one aspect, instead of updating the RSSI signature template, the host device may compare the extracted RSSI signature from the current drive with the RSSI signature template from a previous drive to determine if there is sufficient correlation between them. High correlation between the extracted RSSI signature from the current drive and the RSSI signature template from the previous drive may indicate sufficient confident level in using the extracted RSSI signature for tire localization.

FIG. 1 is a diagram illustrating tire localization in which TPMS sensor data from a tire is localized to the front right wheel 115 of a vehicle, in accordance with one aspect of the present disclosure. A TPMS sensor is placed inside each tire to measure operating conditions such as the pressure or temperature of the tire as the vehicle is driven. The TPMS sensor may wirelessly transmits sensor measurements as data packets to a wireless host device (not shown) in the vehicle. The host device or another onboard computer may monitor the reported sensor measurements to alert the driver to abnormal tire conditions and/or to implement corrective measures to address any critical events. Safe operation of the vehicle relies on the vehicle correctly identifying which tire is experiencing any abnormal conditions by performing tire localization operation to match each TPMS sensor to a wheel.

Figure 2:
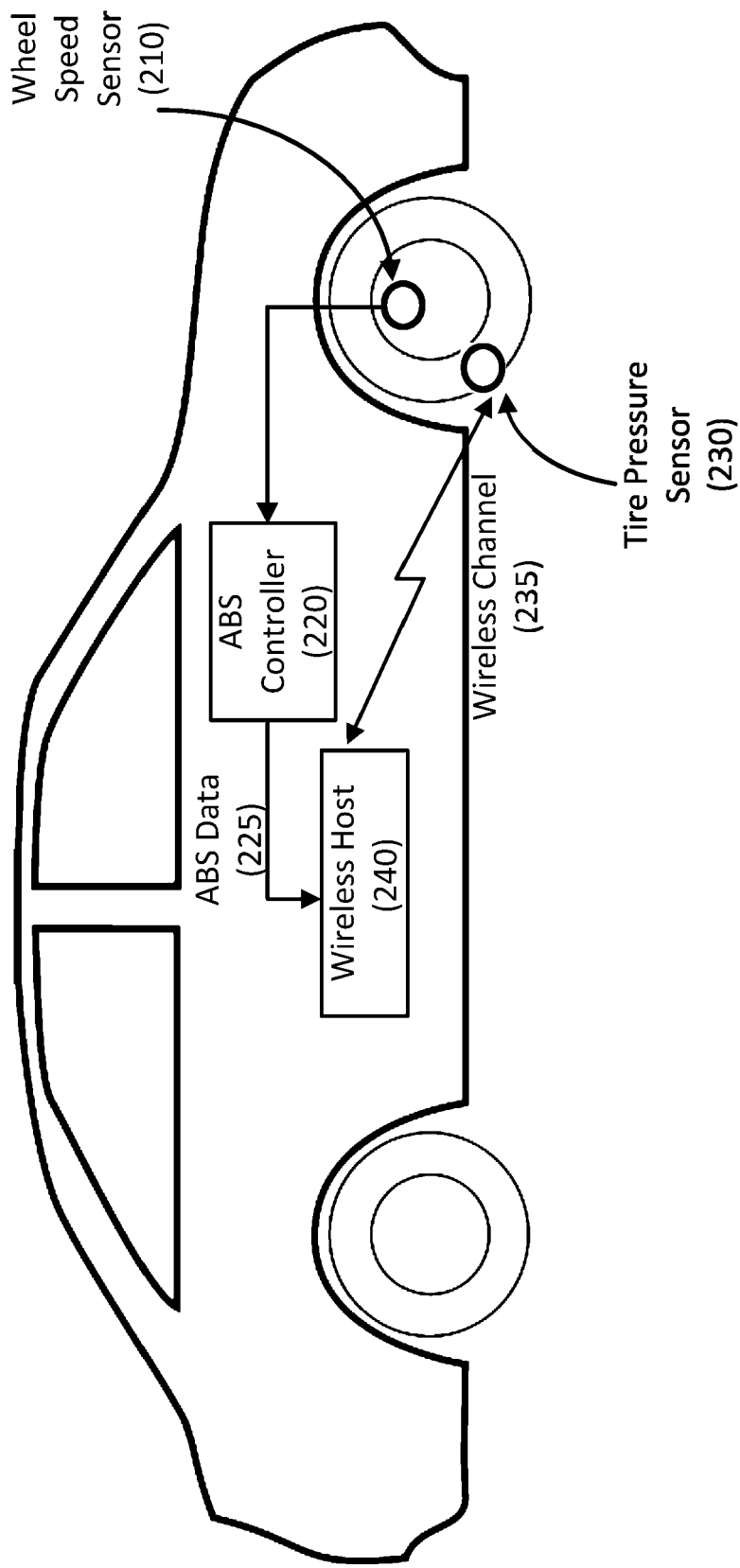
FIG. 2 illustrates a block diagram of a single wireless host device that determines received signal strength indicator (RSSI) signatures of TPMS sensor communication based on wheel angles derived from anti-lock braking (ABS) system data to perform tire localization, in accordance with one aspect of the present disclosure.

FIG. 2 illustrates a block diagram of a single wireless host device that determines received signal strength indicator (RSSI) signatures of TPMS sensor communication based on wheel angles derived from anti-lock braking system (ABS) data to perform tire localization, in accordance with one aspect of the present disclosure. A TPMS sensor 230 in the right front tire may transmit data packets of pressure (and temperature) measurements through wireless channel 235 to a wireless host device 240 located on the vehicle body. In one aspect, communication between the TPMS sensor 230 and wireless host device 240 may be implemented using BLE radio technology. Data packets from TPMS sensor 230 may contain identification information to allow the wireless host device 240 to distinguish between data packets received from each sensor in the four tires of the vehicle. Wireless channel 235 is a function of the position of the TPMS sensor 230 on the rotating tire, also referred to as the wheel angle, when a data packet is transmitted, and is therefore periodic with the rotation of the right front wheel. However, the timing of transmission of the data packet is not synchronized with the wheel rotation as communication events may occur randomly in time.

The wireless host device 240 may determine the RSSI of each received data packet. To determine the RSSI signatures of TPMS sensor communication as a function of wheel angles, the wireless host device 240 may receive ABS data 225 from an ABS controller 220 to estimate the wheel angle corresponding to a received data packet and its RSSI measurement. The ABS data 225 may be measured by a wheel speed sensor (WSS) 210 on each wheel. The WSS data may indicate angle change during dedicated time periods or the rotation speed of each wheel. In one aspect, the WSS data may count the number of wheel rotations, such as rotations per minutes (RPM) for a wheel. Based on the time of reception of each data packet from a TPMS sensor, the wireless host device 240 may use the WSS data to estimate the wheel angle when the data packet was transmitted by the TPMS sensor. The wireless host device 240 may generate the RSSI signature for a TPMS sensor associated with a wheel by pairing a collection of RSSI measurements of data packets from the TPMS sensor with the corresponding wheel angles estimated for the data packets based on the WSS data received from the wheel.

Figure 3:
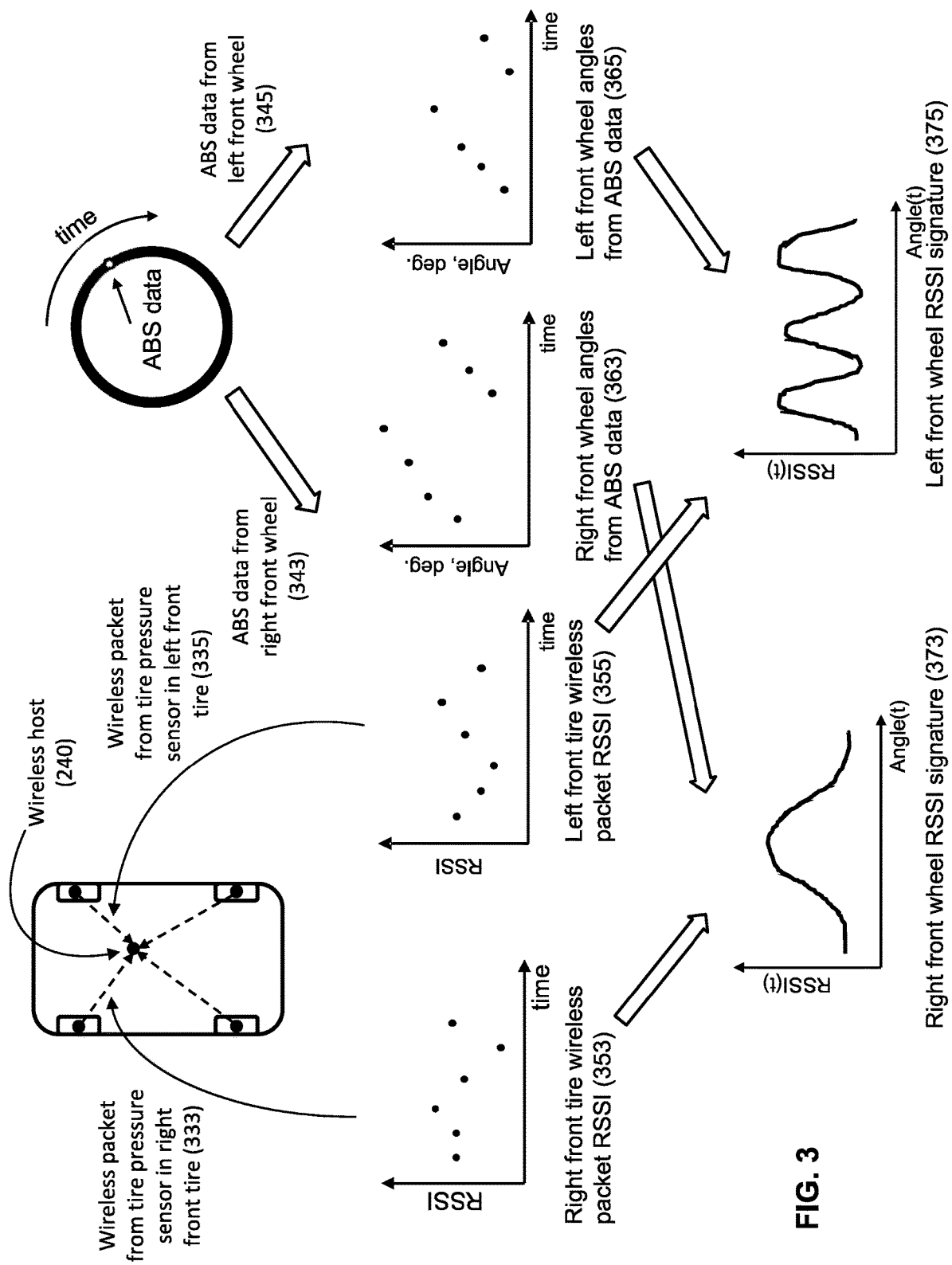
FIG. 3 illustrates a technique for generating RSSI signatures by matching RSSI measurements of TPMS sensor communication from different tires with wheel angles derived from wheel speed sensor of the ABS system to perform tire localization, in accordance with one aspect of the present disclosure.

FIG. 3 illustrates a technique for generating RSSI signatures by matching RSSI measurements of TPMS sensor communication from different tires with wheel angles derived from wheel speed sensor of the ABS system to perform tire localization, in accordance with one aspect of the present disclosure.

The wireless host device 240 may receive data packets of sensor measurements from all four tires including data packets 333 from the TPMS sensor in the right front tire and data packets 335 from the TPMS sensor in the left front tire. The wireless host device 240 may determine the RSSI and the time of reception of each data packet, as well as the identity of the TPMS sending the data packet. As mentioned, TPMS sensor communication is not synchronized with wheel rotation and may occur randomly in time. A plot of the RSSI as a function of time for data packets from the right front tire is shown in diagram 353; a plot of the RSSI as a function of time for data packets from the left front tire is shown in diagram 355.

The wireless host device 240 may receive ABS data from all four wheels including ABS data 343 measured by a speed sensor on the right front wheel and ABS data 345 measured by a speed sensor on the left front wheel. ABS data communication to the wireless host device 240 may be through a wired bus or a wireless channel. From information on the rotational speed of the wheel provided by the ABS data, the wireless host device 240 may estimate the wheel angle of a wheel at the time of reception (or time of transmission) of a data packet from a TPMS sensor. Any error in the estimated wheel angle due to a mismatch between the time of reception of the TPMS data packet and the time of reception of the ABS data is not expected to affect the generation of the RSSI signatures or their use for tire localization. In one aspect, the wireless host device 240 may send requests to TPMS sensors to control the timing of TPMS sensor communication to reduce or control the time mismatch and the error in the estimated wheel angle. A plot of the estimated wheel angles of the right front wheel as a function of the reception time of data packets from the right front tire is shown in diagram 363; a plot of the estimated wheel angles of the left front wheel as a function of the reception time of data packets from the left front tire is shown in diagram 365.

The wireless host device 240 may combine RSSI measurements of multiple data packets from a TPMS sensor and the estimated wheel angles corresponding to the time of reception of the data packets to generate RSSI signatures for the TPMS sensor-wheel pair. For example, a plot of the RSSI signature for the pairing of the TPMS sensor in the right front tire with the estimated angles of the right front wheel is shown in diagram 373; a plot of the RSSI signature for the pairing of the TPMS sensor in the left front tire with the estimated angles of the left front wheel is shown in diagram 375. Because all wheels on a vehicle rotate at slightly different rates, and due to the asymmetry of the antenna of the wireless host device 240 with respect to the antenna of each TPMS sensor when the wireless host device 240 is placed off-center on the vehicle body, the RSSI signatures are a unique marker of each wheel that may be used to identify the locations of the TPMS sensors for tire localization.

A vehicle may have more than one wireless host device 240. Each wireless host device 240 may independently generate the RSSI signatures for the TPMS sensor-wheel pairs based on its RSSI measurements of data packets from the TPMS sensors. In one aspect, the wheel angle estimates corresponding to the time of reception of the data packets may be shared or reused among multiple wireless host devices 240. In one aspect, the noise variance calculated by each wireless host device 240 for the same pairing of TPMS sensor-wheel may be summed when performing tire localization.

Figure 4:
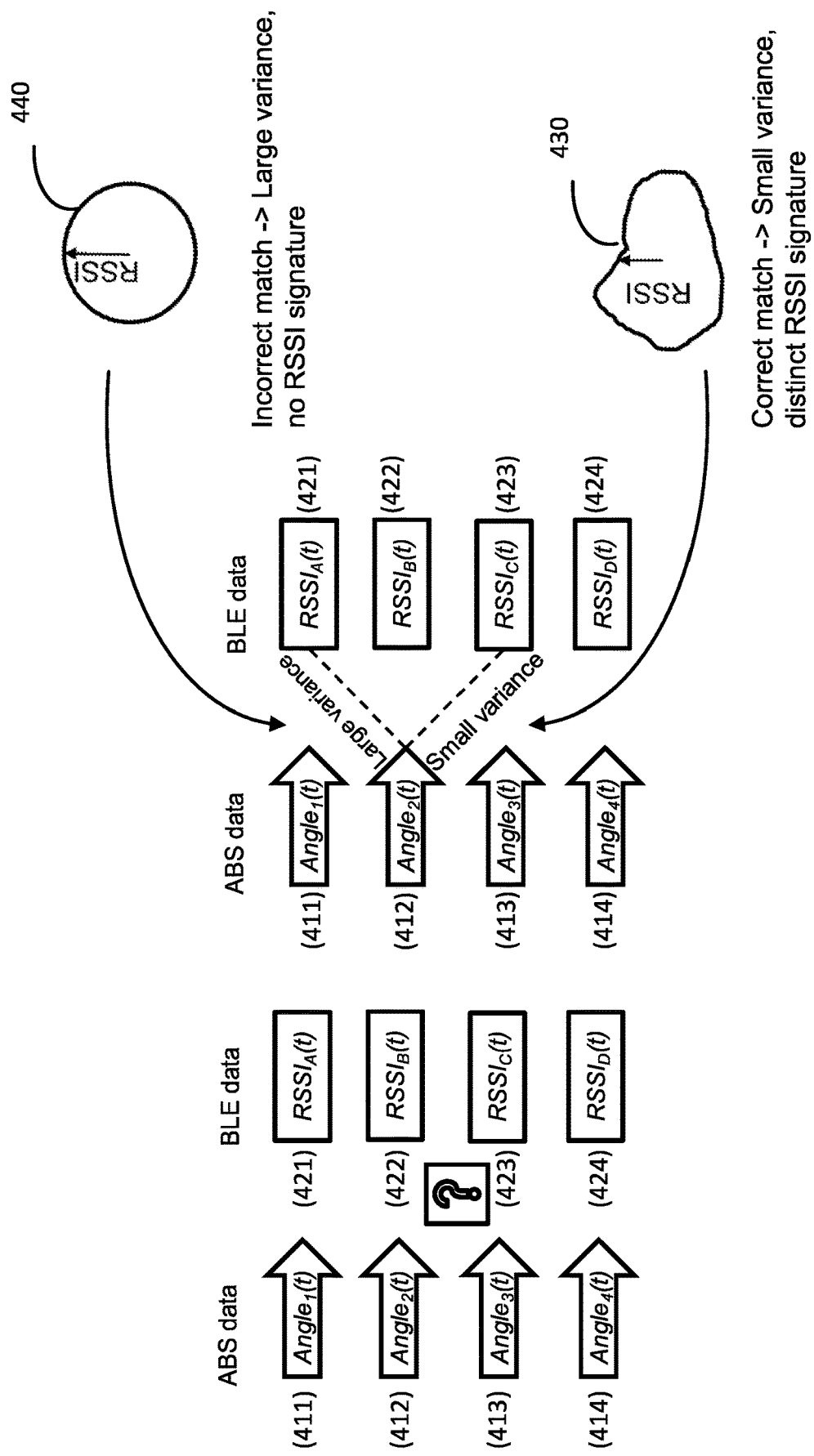
FIG. 4 illustrates the generation of distinct RSSI signatures when RSSI measurements of TPMS sensor communication from a tire is correctly matched with the wheel angles of a wheel, and the lack of distinct RSSI signatures when RSSI measurements of TPMS sensor communication from a tire is not matched with the wheel angles of a right wheel, in accordance with one aspect of the present disclosure.

FIG. 4 illustrates the generation of distinct RSSI signatures when RSSI measurements of TPMS sensor communication from a tire is correctly matched with the wheel angles of a wheel, and the lack of distinct RSSI signatures when RSSI measurements of TPMS sensor communication from a tire is not correctly matched with the wheel angles of a wheel, accordance with one aspect of the present disclosure.

On a vehicle with four wheels, wheel angles are estimated from the ABS data for all four wheels corresponding to the time of reception of a TPMS sensor packet. There are also four TPMS sensors, one in each tire, that may generate data packets. As a result, there are 16 possible pairings of RSSI measurements for 4 TPMS sensors with the estimated wheel angles for 4 wheels, yielding 16 RSSI signatures. More generally, if there are N wheels and N TPMS sensors, the total number of RSSI signatures is $N^2$. Tire localization attempts to find the correct pairing of TPMS sensors and wheels for all TPMS sensors by operating on the $N^2$ RSSI signatures generated from all possible pairings of RSSI measurements for N TPMS sensors with the estimated wheel angles for N wheels.

When the RSSI signature represents a correct pairing of a TPMS sensor and a wheel, the RSSI signature may exhibit identifiable periodic variations over the 360° revolution of a wheel because the RSSI measurements of the TPMS sensor are a function of the wheel angles. On the other hand, when a TPMS sensor is incorrectly paired with a wheel, the RSSI signature may not exhibit identifiable characteristics because the RSSI measurements of the TPMS sensor have been paired with random wheel angles from another wheel. In one aspect, the wireless host device 240 may calculate a metric based on the RSSI signatures to determine the correct pairings of the TPMS sensors and wheels. The metrics may be based on the noise level of the RSSI signatures. The host device may calculate the noise variance of the RSSI signature over the 360° range of wheel angles. The RSSI signatures for correctly paired TPMS sensor-wheel tends to exhibit lower noise variance. The RSSI signatures for incorrectly paired TPMS sensor-wheel may have larger noise variance as expected in a random process.

In FIG. 4, the four wheels are labeled wheels 1, 2, 3 and 4, which may have estimated wheel $angle_1(t)$ 411, $angle_2(t)$ 412, $angle_3(t)$ 413, and $angle_4(t)$ 414, respectively, corresponding to the time of reception of a TPMS sensor packet. The four TPMS sensors are labeled A, B, C, and D, which may have RSSI measurements $RSSI_A(t)$ 421, $RSSI_B(t)$ 422, $RSSI_C(t)$ 423, and $RSSI_D(t)$ 424, respectively. Assuming TPMS sensor C is inside the tire on wheel 2, the RSSI signature 430 generated from the RSSI measurements for TPMS sensor C ($RSSI_C(t)$ 423) and the wheel angles for wheel 2 ($angle_2(t)$ 412) will exhibit a distinct signature and small noise variance. The RSSI signatures 440 generated from the RSSI measurements for TPMS sensor A, B, or D ($RSSI_A(t)$ 421, $RSSI_B(t)$ 422, and $RSSI_D(t)$ 424) and the wheel angles for wheel 2 ($angle_2(t)$ 412) will not exhibit distinct signatures and the noise variance will be large. In the case of four wheels, the wireless host device 240 may calculate a metric for pairing four TPMS sensors with four wheels by summing the noise variance of the four RSSI signatures corresponding to the four pairings of TPMS sensors-wheels. There are 24 different possible ways of pairing four TPMS sensors with four wheels. More generally, for N wheels and N TPMS sensors, there are N! different possible ways of pairing N wheels and N TPMS sensors. The wireless host device 240 may perform tire localization by finding a minimum value of the summed noise variance among all N! combinations of pairing N wheels and N TPMS sensors.

Figure 5:
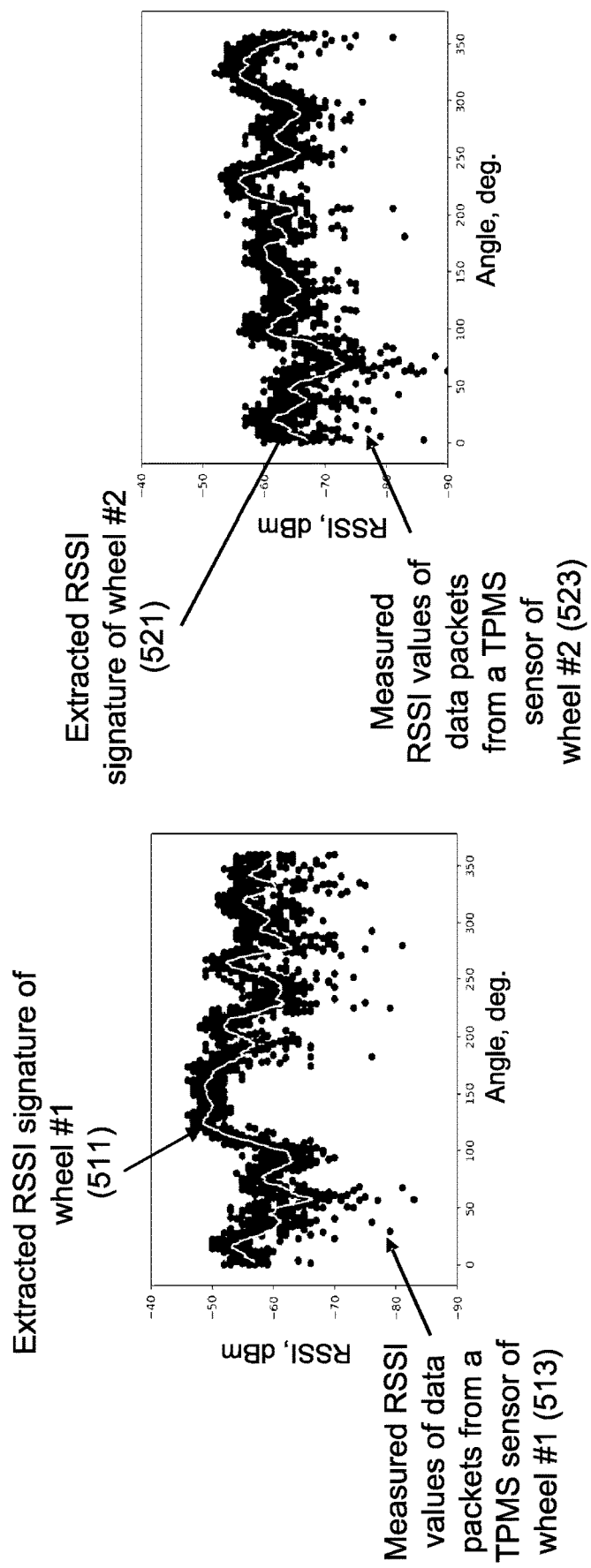
FIG. 5 illustrates properties of the unique RSSI signatures of different wheels sued for tire localization, in accordance with one aspect of the present disclosure.

FIG. 5 illustrates properties of the unique RSSI signatures of different wheels used for tire localization, in accordance with one aspect of the present disclosure. The RSSI signature is generated by measuring the RSSI of multiple data packets and estimating the corresponding wheel angles at the start of a drive.

The diagram on the left shows the RSSI signature 511 for wheel 1 when it is correctly paired with a TPMS sensor in a tire on wheel 1. The range of wheel angles covers the 360° revolution of a wheel. Each point on the RSSI signature represents a vector 513 of the measured RSSI value of a data packet from the TPMS sensor and the estimated angle of wheel 1 when the data packet was received. There may be several hundred RSSI-wheel angle vectors that make up the RSSI signature.

The diagram on the right shows the RSSI signature 521 for wheel 2 when it is correctly paired with a TPMS sensor in a tire on wheel 2. Each point on the RSSI signature represents a vector 523 of the measured RSSI value of a data packet from the TPMS sensor and the estimated angle of wheel 2 when the data packet was received.

A RSSI signature 511 of wheel 1 or a RSSI signature 521 of wheel 2 may be extracted from the respective collection of RSSI-wheel angle vectors by a filtering operation. In one aspect, the extraction operation may average the RSSI-wheel angle vectors in an averaging window to extract the RSSI signatures. The averaging operation may be represented by:

$$\text{Signature}_{ij}(a) = \text{mean}(\text{RSSI}_{ij}[a-\Delta/2, a+\Delta/2]) \quad \text{(Equation 1)}$$

where $\text{Signature}_{ij}(a)$ represents the extracted RSSI signature for wheel angle a for vectors generated from the measured RSSI of data packets from TPMS sensor i and the estimated angles of wheel j; $\text{RSSI}_{ij}[a-\Delta/2, a+\Delta/2]$ represents the measured RSSI of RSSI-wheel angle vectors of data packets from TPMS sensor i and estimated angles of wheel j that are within an averaging window of $\Delta$ centered at wheel angle a.

In one aspect, the extraction operation may use a more general finite-impulse-response (FIR) filter on a window of vectors to extract the RSSI signatures. The filtering operation may be represented by:

$$\text{Signature}_{ij}(a) = \frac{1}{\sum_{n=0}^{N} W(|\text{Angle}_j(t_n) - a|)} \quad \text{(Equation 2)}$$

$$\sum_{n=0}^{N} W(|\text{Angle}_j(t_n) - a|) \cdot \text{RSSI}_i[\text{Angle}_j(t_n)]$$

where W(d) is a weighting function as a function of angular distance d; N is the number of RSSI-wheel angle vectors; $|\text{Angle}_j(t_n) - a|$ is the angular distance between wheel angle a at the center of the weighting function W(d) and the wheel angle of a RSSI-wheel angle vector; $\text{RSSI}_i[\text{Angle}_j(t_n)]$ represents the measured RSSI of RSSI-wheel angle vector referenced in $|\text{Angle}_j(t_n) - a|$. The denominator represents normalization (averaging) of the weighting function.

In one aspect, the averaging operation, the FIR filter, or the weighting function may operate on a sliding window of RSSI-wheel angle vector. In one aspect, the averaging operation, the FIR filter, or the weighting function may operate on a number of discrete angles a over the 360° of the wheel angle. An interpolation of the extracted RSSI signature for discrete angles a may be used to generate the RSSI signatures. In one aspect, a neural network may extract RSSI signatures to show other characteristics such as temporal features.

The extracted RSSI signature 511 for wheel 1 and the extracted RSSI signature 521 for wheel 2 exhibit different characteristics such as differences in the RSSI between maxima and minima. There are also different number of maxima and minima, and different distance between extrema in the two RSSI signatures. Uniqueness of the RSSI signatures allows them to be used for tire localization. Advantageously, distinguishing characteristics of the RSSI signatures are independent of absolute RSSI values. The RSSI signatures are thus less vulnerable to varying environmental conditions such as rain or snow. They also do not require device calibration of the TPMS sensors or the wireless host device.

In one aspect, an autocorrelation of the measured RSSI values from a TPMS sensor with a period of the wheel rotation given by the WSS data of each wheel may be used to generate unique signatures for tire localization. For example, the autocorrelation may be generated by auto-correlating the RSSI measurements from the TPMS sensor where the RSSI measurements used for the auto-correlation function are separated by a hypothetical measurement of the wheel rotation period determined from the WSS data for a wheel. For example, the RSSI measurements of a first rotation period of the wheel may be multiplied with the RSSI measurements of a second (subsequent) rotation period of the same wheel and the product is integrated to generate the autocorrelation. In one aspect, the autocorrelation may be integrated over multiple rotation periods of the wheel. The highest value of the autocorrelation function is expected if the hypothetical measurement of the wheel rotation period for a wheel matches the period of the RSSI measurements, indicating that the RSSI measurements and the wheel are correctly paired. The auto-correlation function may be represented by:

$$ACF = \sum_{n=0}^{99} (RSSI_n \cdot RSSI_{n+p}) \quad \text{(Equation 3)}$$

where $RSSI_n$ are the discrete RSSI measurements over a period of the RSSI signal, and p is the hypothetical measurement of the wheel rotation period determined from the WSS data for a wheel.

Figure 6:
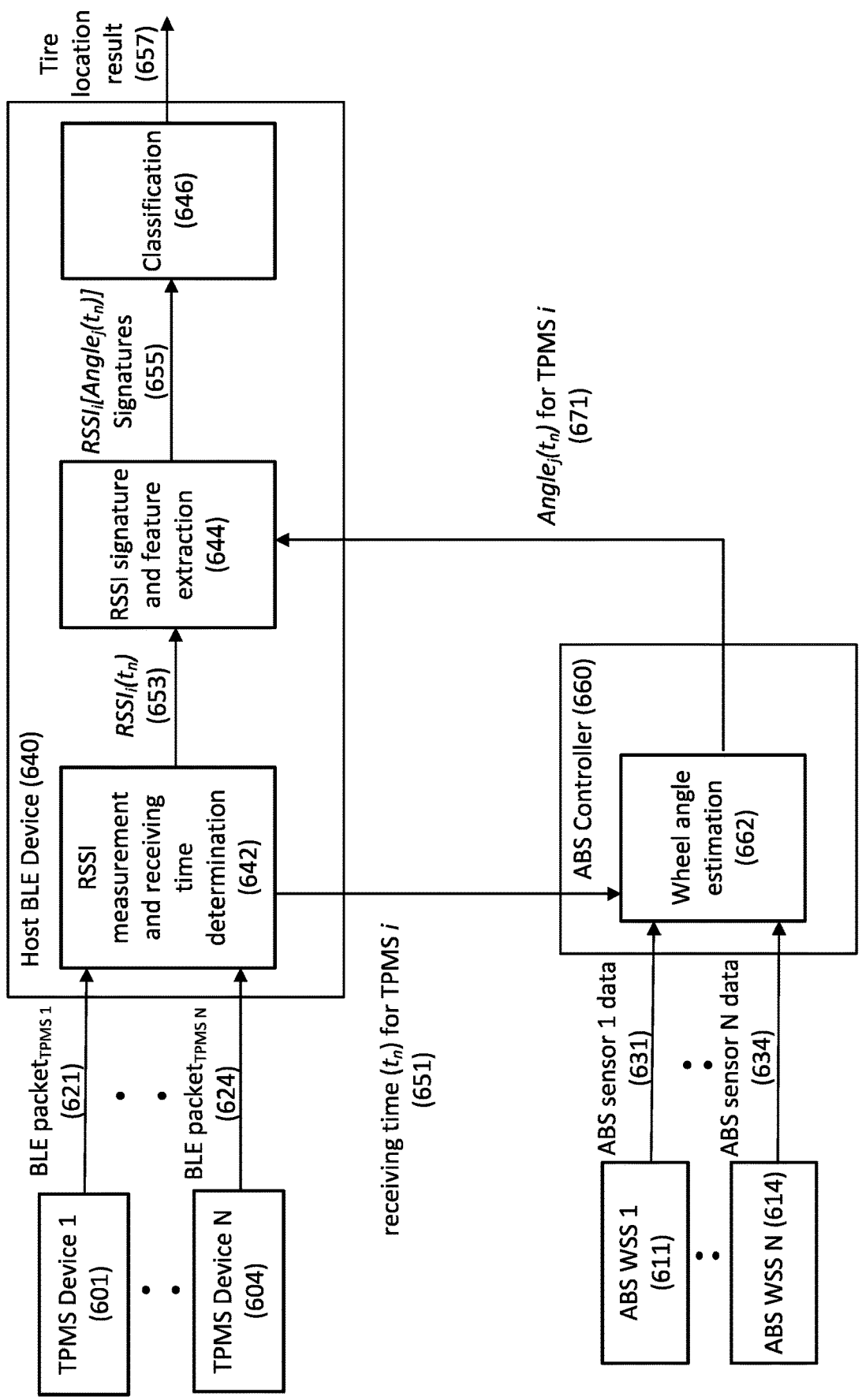
FIG. 6 illustrates a block diagram of a TPMS application in which a wireless host device receives packets from TPMS sensors and estimated wheel angles from an ABS system based on the receiving time of the TPMS packets to generate RSSI signatures and the classification of the RSSI signatures to perform tire location, in accordance with one aspect of the present disclosure.

FIG. 6 illustrates a block diagram of a TPMS application in which a wireless host device 640 receives packets from TPMS sensors and estimated wheel angles from an ABS system based on the receiving time of the TPMS packets to generate RSSI signatures and the classification of the RSSI signatures to perform tire location, in accordance with one aspect of the present disclosure. FIG. 6 is illustrated TPMS communication using BLE, but other radio technologies are also applicable.

The host BLE device 640 may receive BLE data packets from a number of TPMS sensors including data packets 621 from TPMS device 1 (601) and data packets 624 from TPMS device N (604). The host BLE device 640 may perform a RSSI measurement and receiving time determination operation 642 to measure the RSSI and the time of reception of the received data packets. Operation 642 may generate $RSSI_i(t_n)$ 653 representing the measured RSSI of a data packet received at time $t_n$ from TPMS sensor i. The host BLE device 640 may output the receiving time $(t_n)$ 651 of the data packet from TPMS sensor i to an ABS controller 660 for the ABS controller 660 to estimate the wheel angle of a wheel when the data packet was received.

The ABS controller 660 may receive ABS sensor data from a number of ABS sensors, such as WSS data measured by a speed sensor on each wheel. The sensor data may include ABS sensor 1 data 631 from ABS WSS 1 (611) and ABS sensor N data 634 from ABS WSS N (614). The WSS data may indicate angle change during dedicated time period or the rotation speed of each wheel. The ABS controller 660 may perform a wheel angle estimation operation 662 based on the ABS sensor data and the receiving time $(t_n)$ 651 of a data packet from TPMS sensor i to estimate the wheel angle $\text{Angle}_j(t_n)$ 671 for wheel j when the data packet from TPMS sensor i was received. The ABS controller 660 may estimate wheel angle $\text{Angle}_j(t_n)$ 671 for each wheel for output to the host BLE device 640. In one aspect, instead of the ABS controller 660 estimating the wheel angles, the host BLE device 640 may receive sensor data from the ABS controller 660 to estimate the wheel angles.

The host BLE device 640 may perform a RSSI signature and feature extraction operation 644 to extract the RSSI signature $RSSI_i[Angle_j(t_n)]$ 655 representing the pairing of TPMS sensor i and wheel j based on the RSSI measurements $RSSI_i(t_n)$ 653 of data packets from TPMS sensor i and the corresponding wheel angles $Angle_j(t_n)$ 671 for wheel j. The host BLE device 640 may extract RSSI signatures $RSSI_i[Angle_j(t_n)]$ for all possible pairings of N TPMS sensors and N wheels to generate $N^2$ RSSI signatures. The RSSI signature and feature extraction operation 644 may be implemented using the methods described in FIG. 5.

The host BLE device 640 may perform a classification operation 640 to determine the correct pairings of TPMS sensors and wheels for all N TPMS sensors. The classification operation 640 may calculate a metric for each of the $N^2$ RSSI signature such as the noise variance of the RSSI signatures over the 360° range of wheel angles. The classification operation 640 may sum the calculated metrics for a particular pairing of N TPMS sensors with N wheels to generate the summed metrics for this particular combination. Based on $N^2$ RSSI signatures, there are N! different possible ways of pairing N wheels and N TPMS sensors. The classification operation 640 may find the minimum value of the summed metrics among the N! different pairings of N wheels and N TPMS sensors to generate the tire location result 657.

Figure 7:
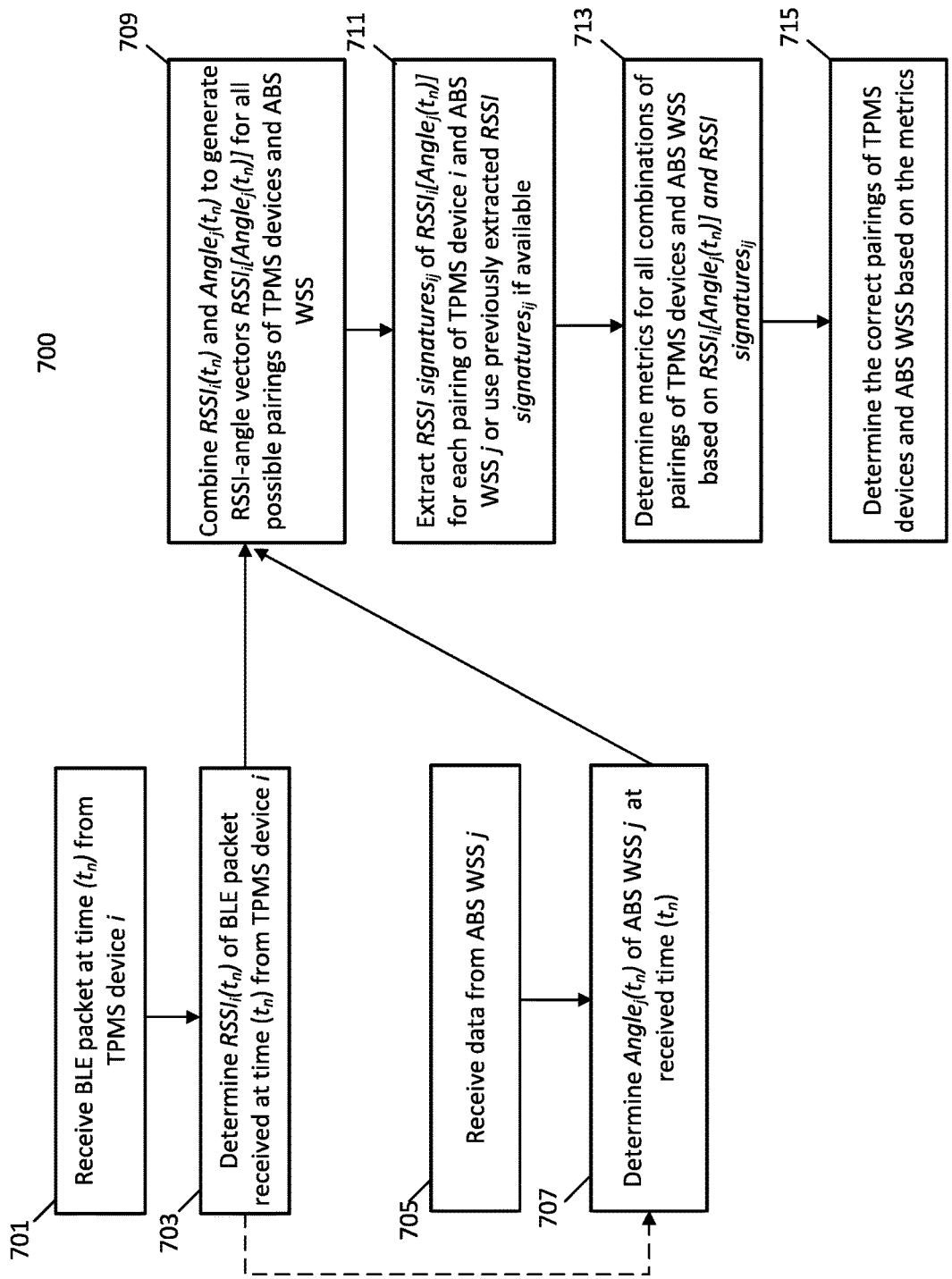
FIG. 7 illustrates a flow diagram of a method for operating a wireless host device to generate RSSI signatures by pairing all combinations of RSSI measurements of TPMS packets with wheel angles derived from ABS sensors and to generate metrics based on the RSSI signatures to determine the correct pairings of TPMS devices and ABS sensors of wheels for tire localization, in accordance with one aspect of the present disclosure.

FIG. 7 illustrates a flow diagram of a method 700 for operating a wireless host device to generate RSSI signatures by pairing all combinations of RSSI measurements of TPMS packets with wheel angles derived from ABS sensors and to generate metrics based on the RSSI signatures to determine the correct pairings of TPMS devices and ABS sensors of wheels for tire localization, in accordance with one aspect of the present disclosure. The method 700 may be performed by a device such as a wireless host device utilizing hardware, software, or combinations of hardware and software.

In operation 701, the wireless host device receives a BLE packet at time $(t_n)$ from TPMS device i. There may be up to N TPMS devices, one in each tire of a vehicle.

In operation 703, the wireless host determines RSSI measurement $RSSI_i(t_n)$ of the BLE packet received at time $(t_n)$ from TPMS device i.

In operation 705, the wireless host receives WSS data from ABS WSS j. There may be up to N ABS wheel speed sensors, one on each wheel. The WSS data of a wheel may indicate angle change during dedicated time period or the rotation speed of the wheel.

In operation 707. The wireless host device determines wheel angle $Angle_j(t_n)$ of ABS WSS j on wheel j at received time $(t_n)$ of the BLE packet. Operation 707 may determine the wheel angle $Angle_j(t_n)$ for each of the N wheels.

In operation 709, the wireless host device combines $RSSI_i(t_n)$ and $Angle_j(t_n)$ to generate RSSI-angle vectors $RSSI_i[Angle_j(t_n)]$ for all possible pairings of RSSI measurements of BLE packets from TPMS device i and wheel angles of ABS WSS j on wheel j.

In operation 711, the wireless host device extracts RSSI signatures$_{ij}$ of $RSSI_i[Angle_j(t_n)]$ for each pairing of TPMS device i and ABS WSS j on wheel j or use previously extracted RSSI signatures$_{ij}$ if available. The wireless host device may collect a number of $RSSI_i[Angle_j(t_n)]$ at the beginning of a drive to generate the RSSI signatures$_{ij}$. For N TPMS devices and N ABS WSS on N wheels, the wireless host device my generate $N^2$ RSSI signatures$_{ij}$. The previously extracted RSSI signatures$_{ij}$ may be generated from a previous drive. The wireless host device may extract RSSI signatures$_{ij}$ for the current drive by using the previously extracted RSSI signatures$_{ij}$ and the collected $RSSI_i[Angle_j(t_n)]$ of the current drive to reduce the number of RSSI measurements for tire localization In operation 713, the wireless host device determines metrics for all combinations of pairings of TPMS device i with ABS WSS j on wheel j based on the collected $RSSI_i[Angle_j(t_n)]$ and the extracted RSSI signatures$_{ij}$. Operation 711 may calculate a metric for each of the $N^2$ RSSI signatures$_{ij}$ by calculating its noise variance over the 360° range of wheel angles. The RSSI signatures$_{ij}$ for a correctly paired TPMS device i and ABS WSS j on wheel j may exhibit a distinct signature and small noise variance. On the other hand, the RSSI signatures$_{ij}$ for a TPMS device i and ABS WSS j on wheel j that have not been correctly paired may not exhibit distinct signatures and the noise variance may be large.

In operation 715, the wireless determines the correct pairings of N TPMS devices with N ABS WSS on N wheels based on the metrics. Operation 715 may sum the calculated metrics for a particular pairing of N TPMS sensors with NABS WSS on N wheels to generate a summed metrics for this particular combination. Based on $N^2$ metrics corresponding to the $N^2$ RSSI signatures$_{ij}$, there are N! different possible ways of pairing N TPMS devices with NABS WSS on N wheels. Operation 715 may find the minimum value of the summed metrics among the N! different pairing N TPMS devices with N ABS WSS on N wheels to identify the correct pairings for tire localization.

Figure 8:
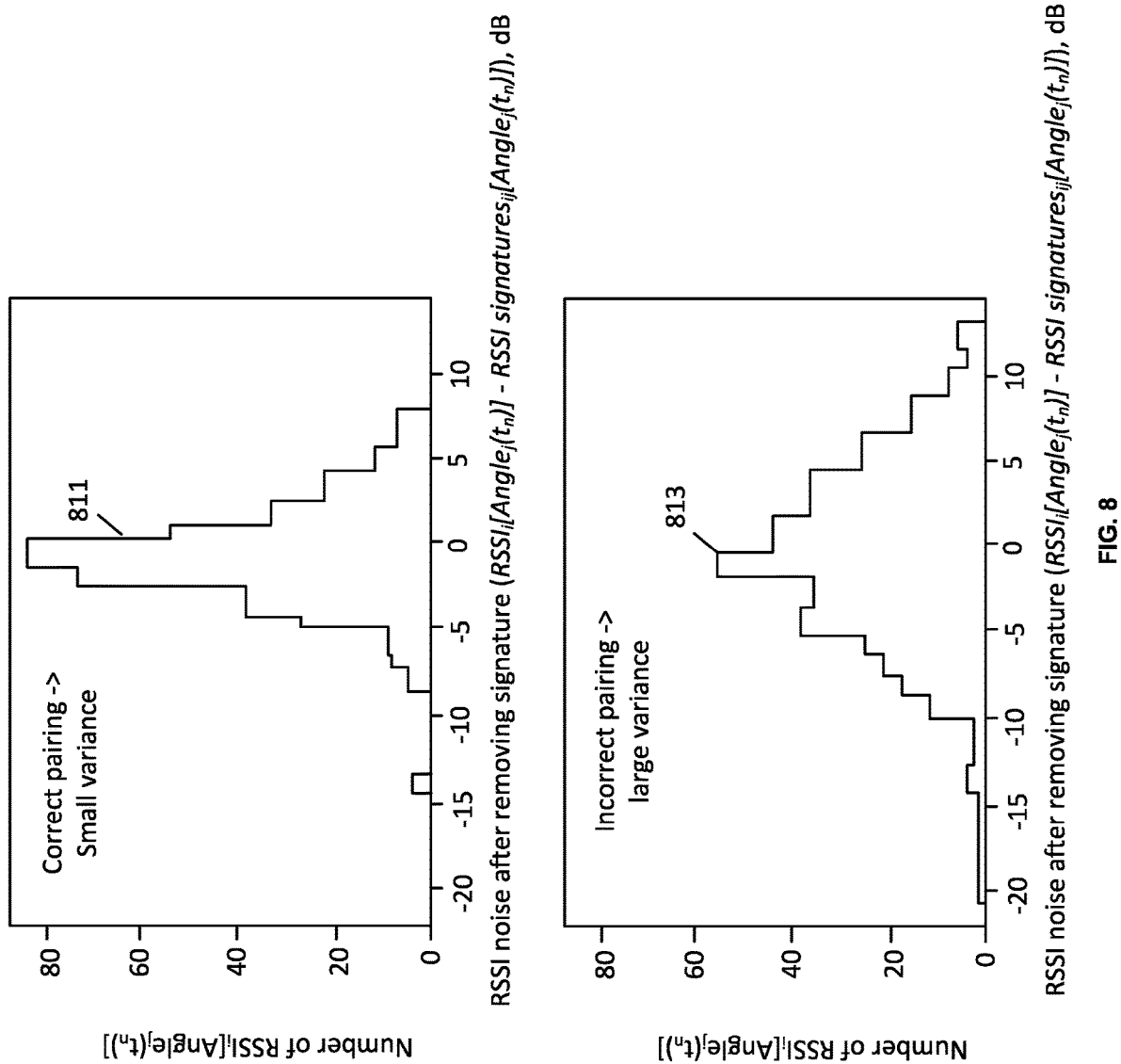
FIG. 8 illustrates differences in the noise of RSSI signatures when TPMS devices are correctly or incorrectly paired with wheels so that the variance may be used as metrics to perform tire localization, in accordance with one aspect of the present disclosure.

FIG. 8 illustrates differences in the noise of RSSI signatures when TPMS devices are correctly or incorrectly paired with wheels so that the variance may be used as metrics to perform tire localization, in accordance with one aspect of the present disclosure.

The noise for RSSI-angle vectors $RSSI_i[Angle_j(t_n)]$ representing the pairing of TPMS sensor i and wheel j may be calculated by subtracting the extracted RSSI signatures$_{ij}$ at wheel angle $Angle_j(t_n)$. The noise represents deviation of $RSSI_i[Angle_j(t_n)]$ from the extracted RSSI signatures$_{ij}$ and may be expressed by:

$$Noise_i[Angle_j(t_n)] = RSSI_i[Angle_j(t_n)] - Signature_{ij}(Angle_j(t_n)) \quad \text{(Equation 4)}$$

where $Noise_i[Angle_j(t_n)]$ represents the noise of $RSSI_i[Angle_j(t_n)]$.

When TPMS sensor i and wheel j is correctly paired, noise tends to be small because the RSSI signatures$_{ij}$ exhibits a distinctive signature over the 360° revolution of a wheel as shown in FIGS. 3, 4, and 5. Diagram 811 in FIG. 8 shows the distribution of noise for the collection of RSSI-angle vectors used to generate RSSI signatures$_{ij}$ when TPMS sensor i and wheel j is correctly paired. The noise is generally small and the variance of RSSI signatures$_{ij}$ would also be small. The variance of RSSI signatures$_{ij}$ may be expressed by:

$$V_{ij} = var\{RSSI_i[Angle_j(t_n)] - Signature_{ij}(Angle_j(t_n))\} \quad \text{(Equation 5)}$$

where $V_{ij}$ represents the variance of RSSI signatures$_{ij}$.

When TPMS sensor i and wheel j is not correctly paired, the wheel angle $Angle_j(t_n)$ does not correspond to the true angle of the wheel when the data packet from TPMS sensor i was received. The RSSI signatures$_{ij}$ is considered as a random process and the noise increases as shown in FIG. 4. Diagram 813 in FIG. 8 shows the distribution of noise for the collection of RSSI-angle vectors used to generate RSSI signatures$_{ij}$ when TPMS sensor i and wheel j is not correctly paired. The noise is generally larger and the variance of RSSI signatures$_{ij}$ would also be larger compared to diagram 811. As a result, the variance of RSSI signatures$_{ij}$ may be used as metrics for tire localization.

Figure 9:
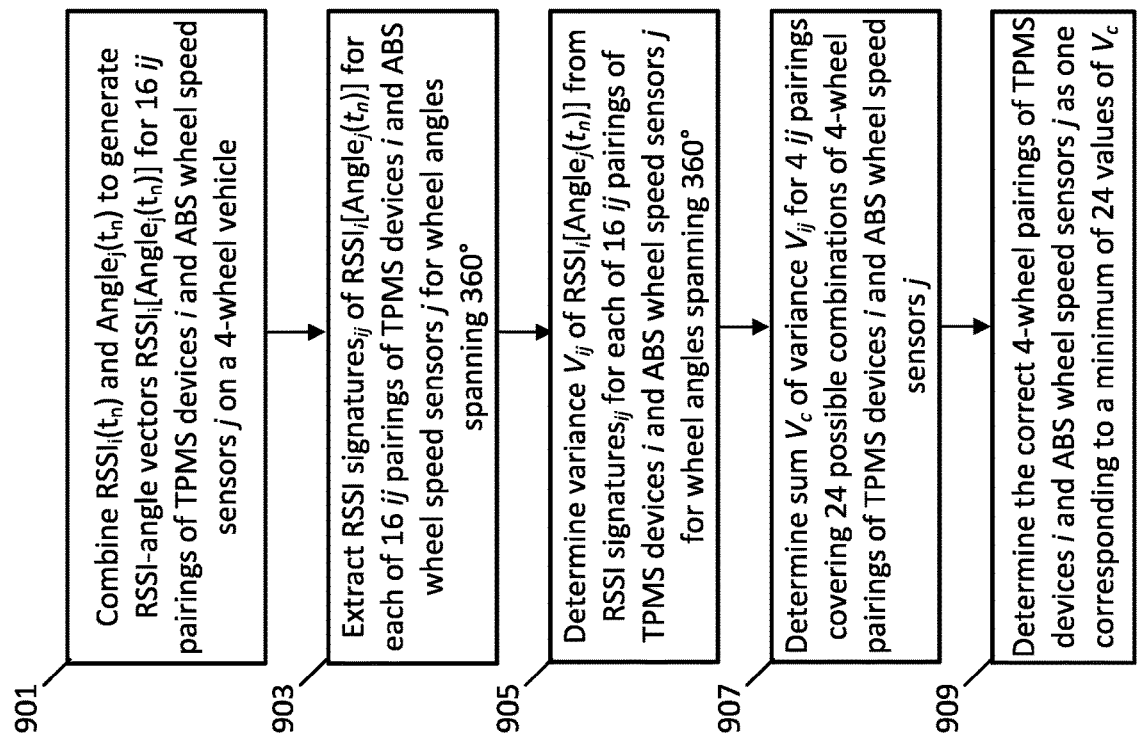
FIG. 9 illustrates a flow diagram of a method to generate RSSI signatures by pairing all 16 combinations of RSSI measurements of TPMS packets with wheel angles derived from ABS sensors for a 4-wheel vehicle and the use of the variance of the RSSI signatures as metrics to perform tire localization, in accordance with one aspect of the present disclosure.

FIG. 9 illustrates a flow diagram of a method 900 to generate RSSI signatures by pairing all 16 combinations of RSSI measurements of TPMS packets with wheel angles derived from ABS wheel speed sensors for a 4-wheel vehicle and the use of the variance of the RSSI signatures as metrics to perform tire localization, in accordance with one aspect of the present disclosure. The method 900 may be performed by a device such as a wireless host device utilizing hardware, software, or combinations of hardware and software.

In operation 901, the device combines $RSSI_i(t_n)$ and $Angle_j(t_n)$ to generate RSSI-angle vectors $RSSI_i[Angle_j(t_n)]$ for 16 ij pairings of TPMS devices i and ABS wheel speed sensors j on a 4-wheel vehicle.

In operation 903, the device extracts RSSI signatures$_{ij}$ of $RSSI_i[Angle_j(t_n)]$ for each of the 16 ij pairings of TPMS devices i and ABS wheel speed sensors j of wheels j for wheel angles spanning 360°.

In operation 905, the device determines variance $V_{ij}$ of $RSSI_i[Angle_j(t_n)]$ from RSSI signatures$_{ij}$ for each of 16 ij pairings of TPMS devices i and ABS wheel speed sensors j of wheels j for wheel angles spanning 360°.

In operation 907, the device determines the sum $V_c$ of variance $V_{ij}$ for 4 ij pairings of TPMS devices i and ABS wheel speed sensors j of wheels j covering all 24 possible combinations of 4-wheel pairings of TPMS devices i and ABS wheel speed sensors j of wheels j.

In operation 909, the device determines the correct 4-wheel pairings of TPMS devices i and ABS wheel speed sensors j of wheels j as the one corresponding to a minimum among the 24 values of the summed variance $V_c$. The device may report the correct 4-wheel pairings as the tire localization result.

In one aspect, the device may determine if there is a distinct minimum in the summed variance $V_c$ of N pairings of TPMS sensor-wheel among the N! possible combinations of the N pairings. For example, the host device may determine a normalized difference between the two smallest summed variance $V_c$ of N pairings of TPMS sensor-wheel among the N! values. In one aspect, such normalized difference may be calculated as:

$$\text{criterium} = \frac{V_{C,2} - V_{C,1}}{V_{C,1}} \qquad \text{(Equation 6)}$$

where the two smallest summed variance $V_c$ of N pairings of TPMS sensor-wheel are represented as $V_{C,1}$ and $V_{C,2}$.

If the normalized difference is greater than a threshold, sufficient confidence in the result of tire localization may be declared. Otherwise, the host device may collect additional RSSI measurements until sufficient confidence in the correct N pairings of TPMS sensor-wheel is attained.

Figure 10:
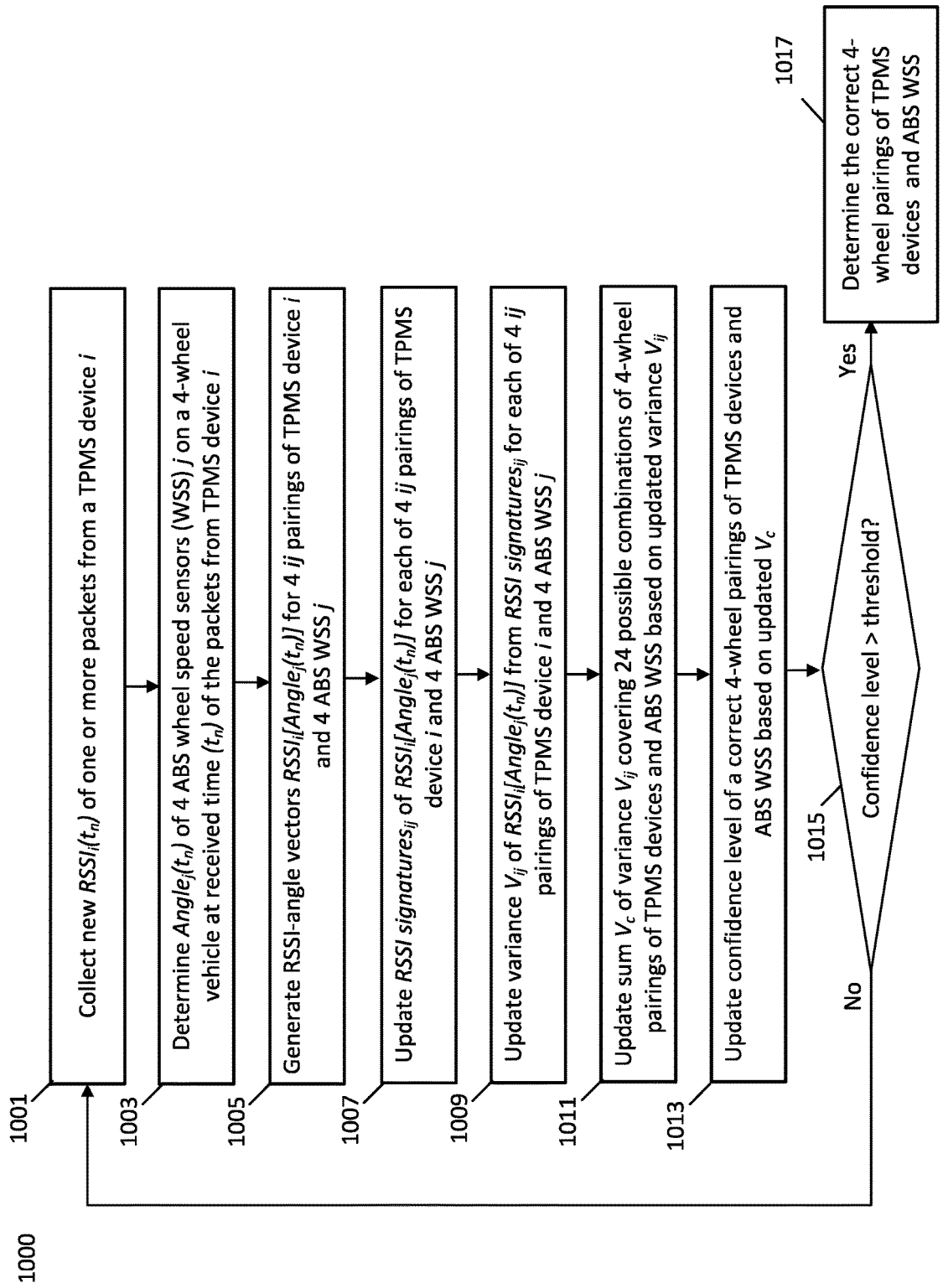
FIG. 10 illustrates a flow diagram of a method to generate a confidence level associated with correct pairings of TPMS sensors with ABS sensors of wheels to determine whether additional RSSI measurements of TPMS sensors are needed to improve the confidence level, in accordance with one aspect of the present disclosure.

FIG. 10 illustrates a flow diagram of a method 1000 to generate a confidence level associated with correct pairings of TPMS sensors with ABS sensors of wheels to determine whether additional RSSI measurements of TPMS sensors are needed to improve the confidence level, in accordance with one aspect of the present disclosure. The method 1000 may be performed by a device such as a wireless host device utilizing hardware, software, or combinations of hardware and software.

In operation 1001, the device collects new $RSSI_i(t_n)$ of one or more packets from a TPMS device i.

In operation 1003, the device determines $Angle_j(t_n)$ of 4 ABS wheel speed sensors (WSS) j on the 4 wheels of a 4-wheel vehicle at received time $(t_n)$ of the packets from TPMS device i.

In operation 1005, the device generates RSSI-angle vectors $RSSI_i[Angle_j(t_n)]$ for 4 ij pairings of TPMS device i with the 4 ABS WSS j on wheels j.

In operation 1007, the device updates the RSSI signatures$_{ij}$ of $RSSI_i[Angle_j(t_n)]$ for each of the 4 ij pairings of TPMS device i with 4 ABS WSS j on wheels j.

In operation 1009, the device updates the variance $V_{ij}$ of $RSSI_i[Angle_j(t_n)]$ from RSSI signatures$_{ij}$ for each of the 4 ij pairings of TPMS device i with 4 ABS WSS j on wheels j.

In operation 1011, the device updates the sum $V_c$ of variance $V_{ij}$ covering 24 possible combinations of 4-wheel pairings of TPMS devices with ABS WSS on wheels based on updated variance $V_{ij}$.

In operation 1013, the device updates the confidence level of a correct 4-wheel pairings of TPMS devices with ABS WSS on wheels based on the updated $V_c$. In one aspect, the confidence level may be a normalized difference between the two smallest summed variance $V_c$ among the 24 summed variance values.

In operation 1015, the device determines if the confidence level exceeds a threshold. If the confidence level exceeds the threshold, in operation 1017 the device determines the 4-wheel pairings of TPMS devices with ABS WSS on wheels corresponding to the smallest summed variance $V_c$ among the 24 summed variance values as the correct 4-wheel pairings. If the confidence level does not exceed the threshold, the device returns to operation 1001 to collect additional $RSSI_i(t_n)$ for TPMS device i. Operations 1003, 1005, 1007, 1009, 1011, 1013, and 1015 may then be repeated.

In one aspect, a host device may determine the RSSI signatures at the beginning of a drive. The host device may store the RSSI signatures of the current drive for use at the next drive to reduce the number of RSSI measurements for tire localization for the next drive. For example, the host device may use the stored RSSI signature for a TPMS sensor-wheel pairing from a previous drive as a RSSI signature template at the start of the current drive. The host device may collect RSSI measurements of data packets from a TPMS sensor and estimate wheel angles of the data packets for the wheel corresponding to the TPMS sensor-wheel pairing of the RSSI signature template to update the RSSI signature template. If the updated RSSI signature template does not achieve sufficient confidence level in the correct N pairings of TPMS sensor-wheel, the host device may extract new RSSI signature based only on RSSI measurements collected and wheel angles estimated during the current drive.

Figure 11:
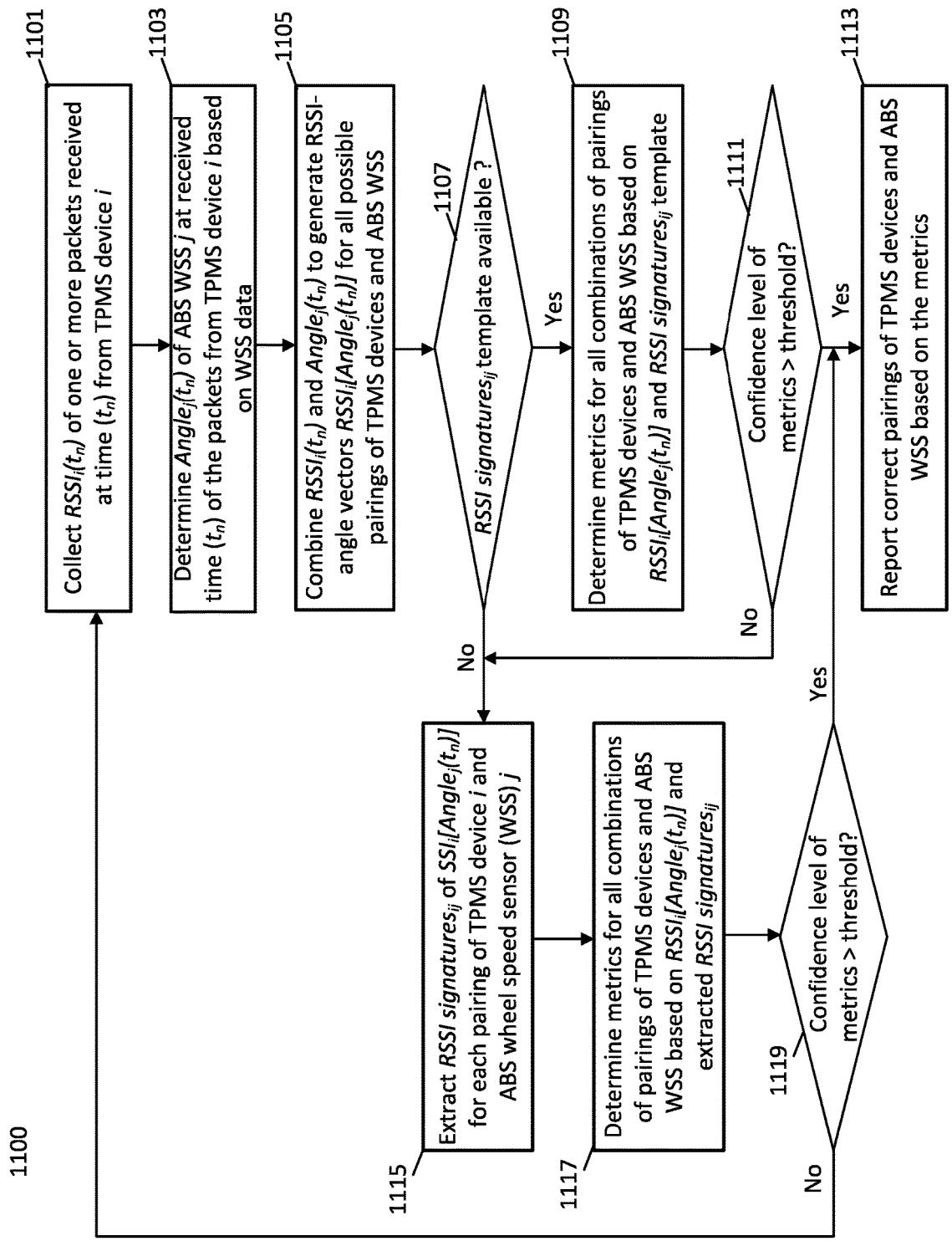
FIG. 11 illustrates a flow diagram of a method to use RSSI signature templates generated from previous operations of a vehicle to aid in the calculation of metrics to perform tire localization, in accordance with one aspect of the present disclosure.

FIG. 11 illustrates a flow diagram of a method 1100 to use RSSI signature templates generated from previous operations of a vehicle to aid in the calculation of metrics to perform tire localization, in accordance with one aspect of the present disclosure. The method 1100 may be performed by a device such as a wireless host device utilizing hardware, software, or combinations of hardware and software.

In operation 1101, the device collects $RSSI_i(t_n)$ of one or more packets received at time $(t_n)$ from TPMS device i. In one aspect, the one or more packets may be BLE packets.

In operation 1103, the device determines wheel angle $Angle_j(t_n)$ of ABS wheel speed sensor (WSS) j on wheel j at received time $(t_n)$ of the packets from TPMS device i based on WSS data from ABS WSS j.

In operation 1105, the device combines $RSSI_i(t_n)$ and $Angle_j(t_n)$ to generate RSSI-angle vectors $RSSI_i[Angle_j(t_n)]$ for all possible pairings of RSSI measurements of packets from TPMS device i and wheel angles of ABS WSS j on wheel j.

In operation 1107, the device determines if there is available a previously generated template for RSSI signatures$_{ij}$ pairing RSSI measurements of packets from TPMS device i and wheel angles of ABS WSS j on wheel j. The previously generated template for RSSI signatures$_{ij}$ may be extracted from a previous drive.

If a previously generated template for RSSI signatures$_{ij}$ is available, in operation 1109, the device determines the metrics for all combinations of pairings of TPMS device i with ABS WSS j on wheel j based on RSSI$_i$[Angle$_j$(t$_n$)] and the previously generated template for RSSI signatures$_{ij}$. In one aspect, the metrics for each combination of pairings of TPMS device i with ABS WSS j on wheel j may be calculated as the variance of the RSSI signatures$_{ij}$ determined from RSSI$_i$[Angle$_j$(t$_n$)] and the previously generated template for RSSI signatures$_{ij}$.

In operation 1111, the device calculates a confidence level of the metrics and determines if the confidence level exceeds a threshold. If the confidence level exceeds the threshold, in operation 1113 the device reports the correct N pairings of TPMS devices i and ABS WSS j of wheel sensors j based on the metrics as the tire localization result. In one aspect, instead of generating the metrics based on RSSI$_i$[Angle$_j$(t$_n$)] and the previously generated template for RSSI signatures$_{ij}$, if available, the device may extract the RSSI signatures$_{ij}$ based on the collected RSSI$_i$[Angle$_j$(t$_n$)] to compare the extracted RSSI signature from the current drive with the RSSI signature template from a previous drive to determine if there is sufficient correlation between them. High correlation between the extracted RSSI signature from the current drive and the RSSI signature template from the previous drive may indicate sufficient confident level in using the extracted RSSI signature for tire localization.

If the confidence level of the metrics does not exceed the threshold, or if in operation 1107, it is determined that a previously generated template for RSSI signatures$_{ij}$ is not available, then in operation 1115, the device extracts RSSI signatures$_{ij}$ based on only the collected RSSI$_i$[Angle$_j$(t$_n$)] for each pairing of TPMS device i and ABS WSS j on wheel j.

In operation 1117, the device determines the metrics for all combinations of pairings of TPMS device i with ABS WSS j on wheel j based on the collected RSSI$_i$[Angle$_j$(t$_n$)] and the extracted RSSI signatures$_{ij}$. In one aspect, the metrics for each combination of pairings of TPMS device i with ABS WSS j on wheel j may be calculated as the variance of the RSSI signatures$_{ij}$ determined from RSSI$_i$[Angle$_j$(t$_n$)] and the extracted RSSI signatures$_{ij}$.

In operation 1119, the device calculates a confidence level of the metrics and determines if the confidence level exceeds a threshold. If the confidence level exceeds the threshold, the device reports the correct N pairings of TPMS devices i and ABS WSS j of wheel sensors j based on the metrics as the tire localization result in operation 1113. If the confidence level does not exceed the threshold, the device returns to operation 1101 to collect additional RSSI$_i$(t$_n$) of packets from TPMS device i. Operations 1103, 1105, 1115, 1117, and 1119 may then be repeated.

Figure 12:
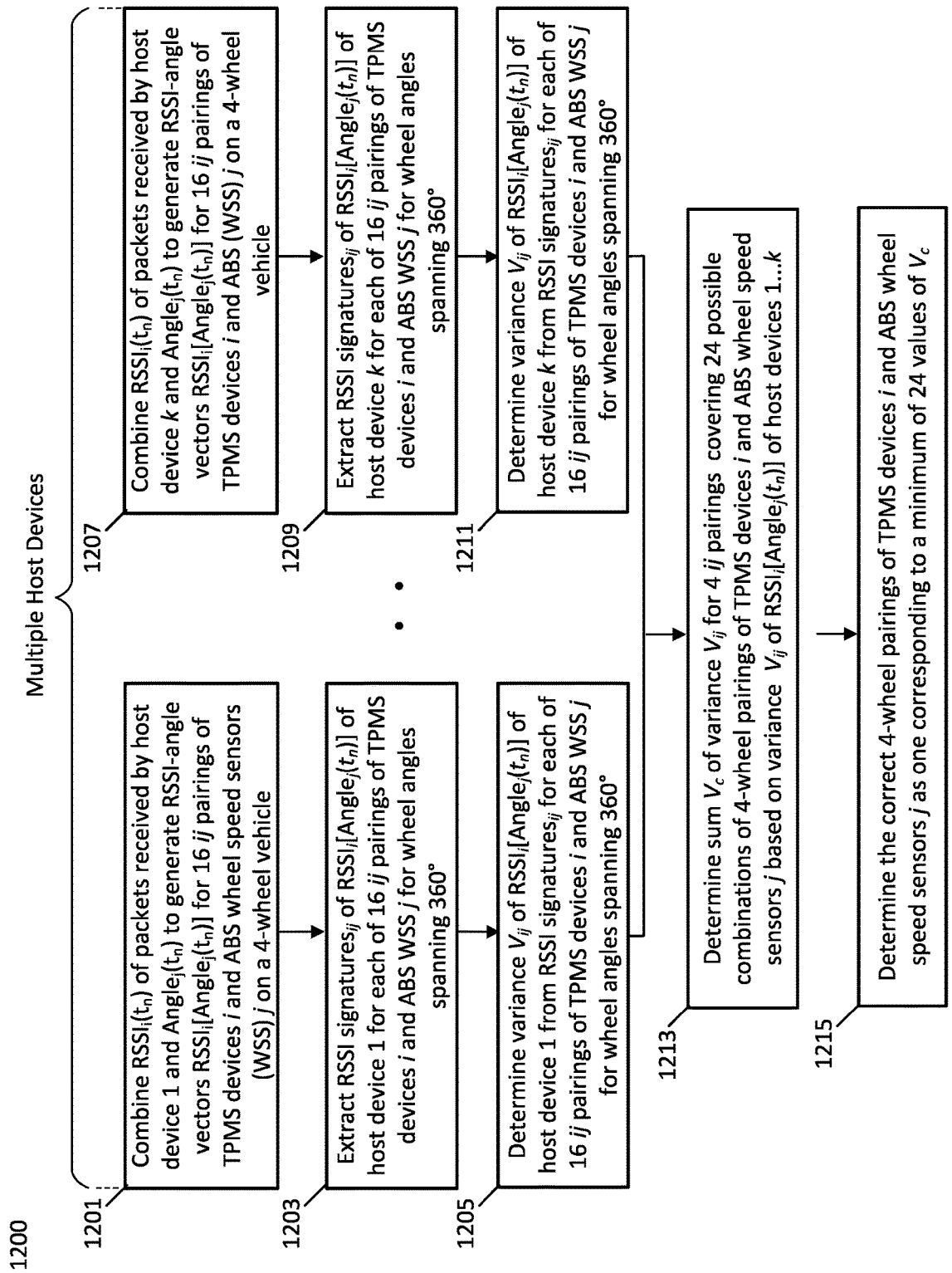
FIG. 12 illustrates a flow diagram of a method to generate RSSI signatures when there are multiple wireless host devices by operating each wireless host device to independently pair all 16 combinations of RSSI measurements of TPMS packets with wheel angles derived from ABS wheel speed sensors for a 4-wheel vehicle and summing the variance of the RSSI signatures from the multiple wireless host devices as metrics to perform tire localization, in accordance with one aspect of the present disclosure.

FIG. 12 illustrates a flow diagram of a method 1200 to generate RSSI signatures when there are multiple wireless host devices by operating each wireless host device to independently pair all 16 combinations of RSSI measurements of TPMS packets with wheel angles derived from ABS sensors for a 4-wheel vehicle and summing the variance of the RSSI signatures from the multiple wireless host devices as metrics to perform tire localization, in accordance with one aspect of the present disclosure. The method 1200 may be performed by the multiple wireless host devices 1, 2, . . . k utilizing hardware, software, or combinations of hardware and software.

In operation 1201, wireless host device 1 combines RSSI$_i$(t$_n$) of packets received by wireless host device 1 with Angle$_j$(t$_n$) to generate RSSI-angle vectors RSSI$_i$[Angle$_j$(t$_n$)] of wireless host device 1 for 16 ij pairings of TPMS devices i and ABS wheel speed sensors j on a 4-wheel vehicle.

In operation 1203, wireless host device 1 extracts RSSI signatures$_{ij}$ of RSSI$_i$[Angle$_j$(t$_n$)] of wireless host device 1 for each of the 16 ij pairings of TPMS devices i and ABS wheel speed sensors j of wheels j for wheel angles spanning 360°.

In operation 1205, wireless host device 1 determines variance Vi j of RSSI$_i$[Angle$_j$(t$_n$)] of wireless host device 1 from RSSI signatures$_{ij}$ of wireless host device 1 for each of 16 ij pairings of TPMS devices i and ABS wheel speed sensors j of wheels j for wheel angles spanning 360°.

Operations 1201, 1203, and 1205 may be performed independently by each of the multiple wireless host devices.

For example, in operation 1207, wireless host device k combines RSSI$_i$(t$_n$) of packets received by wireless host device k with Angle$_j$(t$_n$) to generate RSSI-angle vectors RSSI$_i$[Angle$_j$(t$_n$)] of wireless host device k for 16 y pairings of TPMS devices i and ABS wheel speed sensors j on the 4-wheel vehicle.

In operation 1209, wireless host device k extracts RSSI signatures$_{ij}$ of RSSI$_i$[Angle$_j$(t$_n$)] of wireless host device k for each of the 16 ij pairings of TPMS devices i and ABS wheel speed sensors j of wheels j for wheel angles spanning 360°.

In operation 1211, wireless host device k determines variance G of RSSI$_i$[Angle$_j$(t$_n$)] of wireless host device k from RSSI signatures$_{ij}$ of wireless host device k for each of 16 ij pairings of TPMS devices i and ABS wheel speed sensors j of wheels j for wheel angles spanning 360°.

In operation 1213, one of the wireless host devices or a separate controller determines the sum V$_c$ of variance V$_{ij}$ for 4 ij pairings of TPMS devices i and ABS wheel speed sensors j of wheels j covering all 24 possible combinations of 4-wheel pairings of TPMS devices i and ABS wheel speed sensors j of wheels j by summing the variance V$_{ij}$ for the corresponding pairings of TPMS devices i and ABS wheel speed sensors j from the k wireless host devices In operation 1215, the one wireless host device or the controller determines the correct 4-wheel pairings of TPMS devices i and ABS wheel speed sensors j of wheels j as the one corresponding to a minimum among the 24 values of the summed variance V$_c$. The device or the controller may report the correct 4-wheel pairings as the tire localization result.

Figure 13:
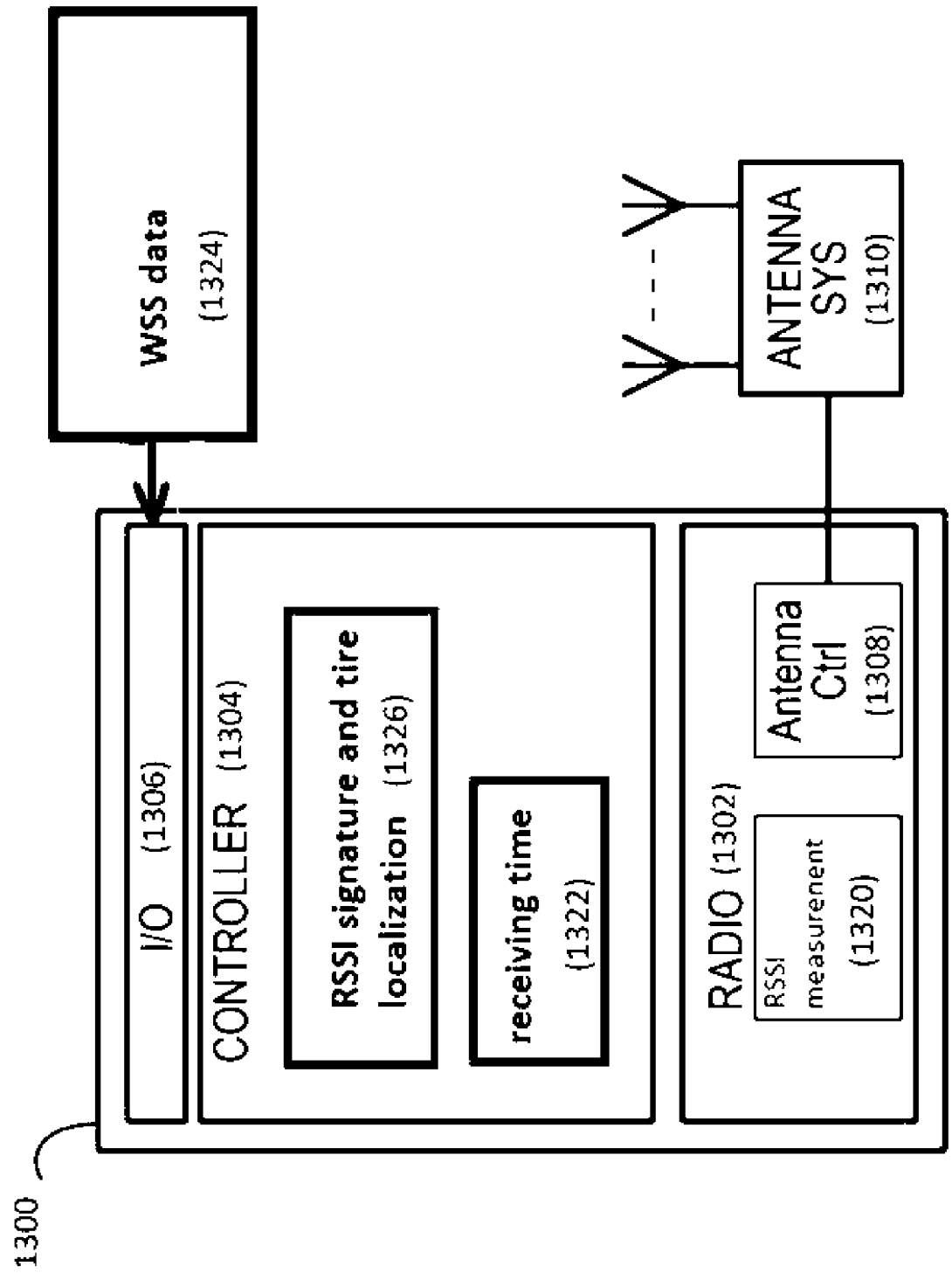
FIG. 13 illustrates a block diagram of a device that determines received signal strength indicator (RSSI) signatures of TPMS sensor communication based on wheel angles derived from ABS WSS data to perform tire localization, in accordance with one aspect of the present disclosure.

FIG. 13 illustrates a block diagram of a device 1300 that determines received signal strength indicator (RSSI) signatures of TPMS sensor communication based on wheel angles derived from ABS WSS data to perform tire localization, in accordance with one aspect of the present disclosure. In one aspect, device 1300 may be the wireless host device 240 of FIG. 2.

The device 1300 may include a radio 1302, an antenna subsystem 1310, a device controller 1304, and an I/O subsystem 1306. The radio 1302 may include an antenna controller 1308 coupled to the antenna subsystem 1310 to receive sensor data packets transmitted by the TPMS devices and/or to transmit control packets to the TPMS devices. The radio 1302 may be a short-range narrow-band radio implementing Bluetooth Low Energy (BLE), IEEE 802.15.4, IEEE 802.11, or other radio access technologies. The antenna subsystem 1310 may include an array of antennas with beamforming or directional capabilities to increase the antenna gain. The antenna controller 1308 may measure the RSSI of each received data packet received from the TPMS devices in an RSSI measurement operation 1320.

The device controller 1304 may receive WSS data 1324 from an ABS controller via the I/O subsystem 1306 to estimate the wheel angles for multiple wheels corresponding to a received data packet from a TPMS device. The WSS data 1324 may be measured by a WSS on each wheel. The WSS data may indicate angle change during dedicated time periods or the rotation speed of each wheel. Based on the receiving time (1322) of each data packet received from a TPMS device, the controller 1304 may use the WSS data 1324 to estimate the wheel angle for each wheel when the data packet was transmitted by the TPMS device. The controller 1304 may generate the RSSI signature for a TPMS device associated with a wheel by pairing a collection of RSSI measurements of data packets from the TPMS device with the corresponding wheel angles estimated for the data packets based on the WSS data received from the wheel in an RSSI signature and tire localization operation 1326. The RSSI signatures are a unique marker of each wheel that may be used to identify the locations of the TPMS devices for tire localization.

In one aspect, to improve the RSSI signatures, the antenna subsystem 1310 may include polarization antennas that weakly receive reflections from the ground to decrease multipath effect of the transmissions from the TPMS devices. To further decrease the multipath effect, the antenna subsystem 1310 and the radio 1302 may be placed on the bottom side of a vehicle to provide a line-of-sight to the TPMS devices. Such a placement may also leverage shadowing effects to increase RSSI signature variations for improved RSSI signatures. In one aspect, the antenna controller 1308 may switch between two directional antennas in the middle of a packet to obtain extra information on the characteristics of the wireless communication channel between the radio 1302 and the TPMS devices.

The described techniques for determining pairings of TPMS sensors to wheels on a vehicle based on RSSI signatures derived from RSSI of data packets received from the TPMS sensors and wheel angles of the wheels may be applied to other applications of device localization. In one aspect, the described techniques may be applied to pairing a first set of sensors with a second set of sensors using RSSI signatures of packets received from the first set of sensors when the RSSI is a function of the angular position of a corresponding second sensor.

Figure 14:
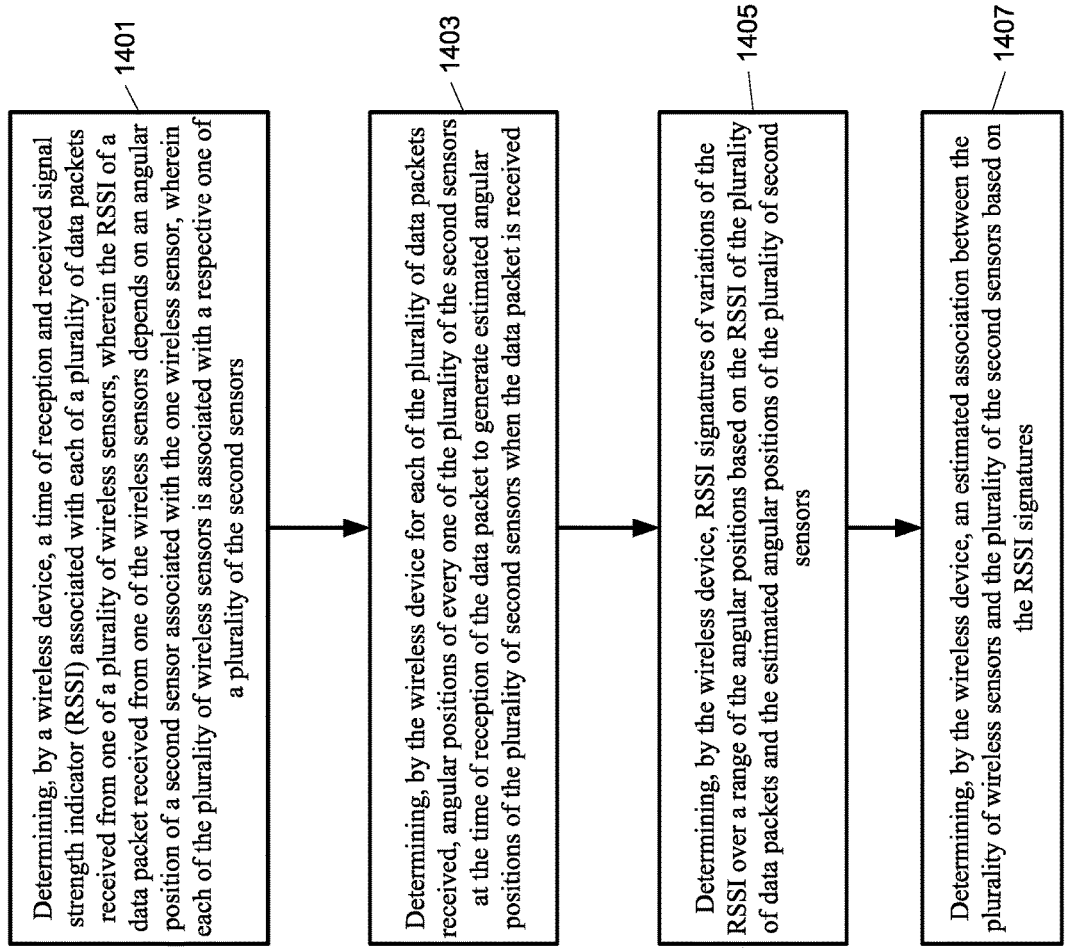
FIG. 14 illustrates a flow diagram of a method to associate a first set of wireless sensors with a second set of sensors using RSSI signatures of packets received from the first set of wireless sensors when the RSSI of data packets received from the first set of wireless sensors depend on angular positions of corresponding second sensors, in accordance with one aspect of the present disclosure.

FIG. 14 illustrates a flow diagram of a method 1400 to associate a first set of wireless sensors with a second set of sensors using RSSI signatures of packets received from the first set of wireless sensors when the RSSI of data packets received from the first set of wireless sensors depend on angular positions of corresponding second sensors, in accordance with one aspect of the present disclosure. The method 1400 may be performed by a device such as a wireless host device utilizing hardware, software, or combinations of hardware and software.

In operation 1401, a wireless device determines a time of reception and received signal strength indicator (RSSI) associated with each of multiple data packets received from one of a first set of wireless sensors. The RSSI of a data packet received from one of the first set of wireless sensors depends on an angular position of a second sensor associated with the wireless sensor. Each of the first set of wireless sensors is associated with a respective one of a second sensor from a second set.

In operation 1403, for each of the multiple data packets received, the wireless device determines angular positions of every one of the second sensors at the time of reception of the data packet to generate estimated angular positions of the set of second sensors when the data packet is received.

In operation 1405, the wireless device determines RSSI signatures of variations of the RSSI over a range of the angular positions. The RSSI signatures are determined based on the RSSI of the multiple data packets received from the first set of wireless sensors and the estimated angular positions of the set of second sensors when each of the multiple data packets are received.

In operation 1407, the wireless device determines an association between the first set of wireless sensors and the second set of second sensors based on the RSSI signatures.

Various embodiments of tire localization for pairing TPMS sensors to wheels on a vehicle, or more generally techniques for pairings a first set of sensors with a second set of sensors based on RSSI signatures of communication from the first set of sensors and angular position of a corresponding second sensor described herein may include various operations. These operations may be performed and/or controlled by hardware components, digital hardware and/or firmware/programmable registers (e.g., as implemented in computer-readable medium), and/or combinations thereof. For example, the operations may be performed by a general-purpose computer or a processing system executing computer program stored in a computer-readable medium. The methods and illustrative examples described herein are not inherently related to any particular device or other apparatus. Various systems (e.g., such as a wireless device operating in a near or long field environment, pico area network, wide area network, etc.) may be used in accordance with the teachings described herein, or it may prove convenient to construct more specialized apparatus to perform the required method steps. The required structure for a variety of these systems will appear as set forth in the description above.

A computer-readable medium used to implement operations of various aspects of the disclosure may be non-transitory computer-readable storage medium that may include, but is not limited to, electromagnetic storage medium, magneto-optical storage medium, read-only memory (ROM), random-access memory (RAM), erasable programmable memory (e.g., EPROM and EEPROM), flash memory, or another now-known or later-developed non-transitory type of medium that is suitable for storing configuration information.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "may include", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times, or the described operations may be distributed in a system which allows the occurrence of the processing operations at various intervals associated with the processing. For example, certain operations may be performed, at least in part, in a reverse order, concurrently and/or in parallel with other operations.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component.

Additionally, "configured to" or "configurable to" can include generic structure (e.g., generic circuitry) that is manipulated by firmware (e.g., an FPGA) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method of operations by a wireless device, comprising:

determining a time of reception and received signal strength indicator (RSSI) associated with each of a plurality of data packets received from one of a plurality of wireless sensors, wherein the RSSI of a data packet received from one of the wireless sensors depends on an angular position of a second sensor associated with the one wireless sensor, wherein each of the plurality of wireless sensors is associated with a respective one of a plurality of second sensors;

determining, for each of the plurality of data packets received, angular positions of every one of the plurality of the second sensors at the time of reception of the data packet to generate estimated angular positions of the plurality of second sensors when the data packet is received;

determining RSSI signatures of variations of the RSSI over a range of the angular positions based on the RSSI of the plurality of data packets and the estimated angular positions of the plurality of second sensors; and determining an estimated association between the plurality of wireless sensors and the plurality of the second sensors based on the RSSI signatures.

2. The method of claim 1, wherein the plurality of wireless sensors comprises a plurality of tire sensors of a tire pressure monitoring system (TPMS), wherein each of the tire sensors is located in a tire of a vehicle to measure an operating condition of the tire, and wherein the plurality of second sensors comprise a plurality of wheel speed sensors of the vehicle, wherein each of the wheel speed sensors measures an angular velocity of a wheel of the vehicle.

3. The method of claim 2, wherein the estimated association between the plurality of wireless sensors and the plurality of the second sensors comprises pairings of each of the plurality tire sensors with a different wheel of the vehicle.

4. The method of claim 2, wherein determining angular positions of every one of the plurality of second sensors at the time of reception of the data packet comprises:

receiving a plurality of wheel speed measurements from the plurality of wheel speed sensors; and estimating a wheel angle for each wheel of the vehicle based on the plurality of wheel speed measurements when the data packet is received by the wireless device.

5. The method of claim 4, wherein determining RSSI signatures of variations of the RSSI over a range of the angular positions comprises:

pairing the RSSI of each of the plurality of data packets received from one of the tire sensors with the estimated wheel angle for each wheel of the vehicle.

6. The method of claim 1, wherein a number of the RSSI signatures comprises a product of a number of the plurality of the wireless sensors and a number of the plurality of the second sensors assuming each of the plurality of wireless sensors is associated with every one of the plurality of second sensors, and wherein determining an estimated association between the plurality of wireless sensors and the plurality of the second sensors based on the RSSI signatures comprises:

determining a plurality of metrics, one metric for each of the RSSI signatures; and determining the estimated association between the plurality of wireless sensors and the plurality of the second sensors based on the plurality of metrics.

7. The method of claim 6, wherein the metric for the RSSI signatures for one of the wireless sensors and one of the second sensors comprises a variance of the RSSI of the plurality of data packets received from the said one wireless sensor over the range of the estimated angular positions of the said second sensor.

8. The method of claim 7, wherein determining the estimated association between the plurality of wireless sensors and the plurality of the second sensors based on the plurality of metrics comprises:
 adding the variance for the RSSI signatures corresponding to associating each of the plurality of wireless sensor with a different one of the second sensors to generate a summed variance for all possible combinations of associating the plurality of wireless sensors and the plurality of second sensors; and
 determining the estimated association as one corresponding to a minimum value among the plurality of summed variance for all possible combinations of associating the plurality of wireless sensors and the plurality of second sensors.

9. The method of claim 6, wherein determining the estimated association between the plurality of wireless sensors and the plurality of the second sensors based on the plurality of metrics comprises:
 determining a confidence level of the estimated association based on the plurality of metrics;
 comparing the confidence level with a threshold level;
 determining the estimated association in response to the confidence level exceeding the threshold level; and
 receiving additional data packets from the plurality of wireless sensors to increase the confidence level of the estimated association in response to the confidence level failing to exceed the threshold level.

10. The method of claim 1, wherein determining RSSI signatures of variations of the RSSI over a range of the angular positions comprises:
 determining the RSSI signatures from previously stored RSSI signatures, the plurality of data packets received from the plurality of wireless sensors and the estimated angular positions of the plurality of second sensors when each of the plurality of data packets are received.

11. An apparatus comprising:
 a transceiver configured to receive a plurality of data packets from a plurality of wireless sensors; and
 a processing system configured to:
  determine a time of reception and received signal strength indicator (RSSI) associated with each of the plurality of data packets received from one of the plurality of wireless sensors, wherein the RSSI of a data packet received from one of the wireless sensors depends on an angular position of a second sensor associated with the one wireless sensor, wherein each of the plurality of wireless sensors is associated with a respective one of a plurality of second sensors;
  determine, for each of the plurality of data packets received, angular positions of every one of the plurality of second sensors to generate estimated angular positions of the plurality of second sensors at the time of reception of the data packet or to generate hypothetical measurement periods of the plurality of second sensors;
  determine RSSI signatures of variations of the RSSI based on the RSSI of the plurality of data packets and the estimated angular positions or the hypothetical measurement periods of the plurality of second sensors; and
  determine an estimated association between the plurality of wireless sensors and the plurality of the second sensors based on the RSSI signatures.

12. The apparatus of claim 11, wherein the plurality of wireless sensors comprises a plurality of tire sensors of a tire pressure monitoring system (TPMS), wherein each of the tire sensors is located in a tire of a vehicle to measure an operating condition of the tire, and wherein the plurality of second sensors comprise a plurality of wheel speed sensors of the vehicle, wherein each of the wheel speed sensors measures an angular velocity of a wheel of the vehicle.

13. The apparatus of claim 12, wherein the estimated association between the plurality of wireless sensors and the plurality of the second sensors comprises pairings of each of the plurality tire sensors with a different wheel of the vehicle.

14. The apparatus of claim 12, wherein to determine angular positions of every one of the plurality of second sensors at the time of reception of the data packet, the apparatus is configured to receive a plurality of wheel speed measurements from the plurality of wheel speed sensors, and the processing system is further configured to:
 estimate a wheel angle for each wheel of the vehicle based on the plurality of wheel speed measurements when the data packet is received by the apparatus.

15. The apparatus of claim 14, wherein to determine RSSI signatures of variations of the RSSI, the processing system is further configured to:
 pair the RSSI of each of the plurality of data packets received from one of the tire sensors with the estimated wheel angle for each wheel of the vehicle.

16. The apparatus of claim 11, wherein a number of the RSSI signatures comprises a product of a number of the plurality of the wireless sensors and a number of the plurality of the second sensors assuming each of the plurality of wireless sensors is associated with every one of the plurality of second sensors, and wherein to determine an estimated association between the plurality of wireless sensors and the plurality of the second sensors based on the RSSI signatures, the processing system is further configured to:
 determine a plurality of metrics, one metric for each of the RSSI signatures; and
 determine the estimated association between the plurality of wireless sensors and the plurality of the second sensors based on the plurality of metrics.

17. The apparatus of claim 16, wherein the metric for the RSSI signatures for one of the wireless sensors and one of the second sensors comprises a variance of the RSSI of the plurality of data packets received from the said one wireless sensor over the range of the estimated angular positions of the said second sensor.

18. The apparatus of claim 17, wherein to determine an estimated association between the plurality of wireless sensors and the plurality of the second sensors based on the plurality of metrics, the processing system is further configured to:
 add the variance for the RSSI signatures corresponding to associating each of the plurality of wireless sensor with a different one of the second sensors to generate a summed variance for all possible combinations of associating the plurality of wireless sensors and the plurality of second sensors; and
 determine the estimated association as one corresponding to a minimum value among the plurality of summed variance for all possible combinations of associating the plurality of wireless sensors and the plurality of second sensor.

19. The apparatus of claim 16, where to determine an estimated association between the plurality of wireless sensors and the plurality of the second sensors based on the plurality of metrics, the processing system is further configured to:
  determine a confidence level of the estimated association based on the plurality of metrics;
  compare the confidence level with a threshold level; and
  determine the estimated association in response to the confidence level exceeding the threshold level, or
  in response to the confidence level failing to exceed the threshold level, the transceiver is configured to receive additional data packets from the plurality of wireless sensors to increase the confidence level of the estimated association.

20. A system comprising:
  a wireless transceiver configured to receive a plurality of data packets from a plurality of wireless sensors;
  an interface configured to receive measurements from a plurality of second sensors associated with the plurality of wireless sensors; and
  a processor system configured:
    determine a time of reception and received signal strength indicator (RSSI) associated with each of the plurality of data packets received from one of the plurality of wireless sensors, wherein the RSSI of a data packet received from one of the wireless sensors depends on an angular position of one of the plurality of second sensors associated with the one wireless sensor, wherein each of the plurality of wireless sensors is associated with a respective one of the plurality of second sensors;
    determine, for each of the plurality of data packets received, angular positions of every one of the plurality of second sensors to generate estimated angular positions of the plurality of second sensors at the time of reception of the data packet or to generate hypothetical measurement periods of the plurality of second sensors;
    determine RSSI signatures of variations of the RSSI based on the RSSI of the plurality of data packets and the estimated angular positions or the hypothetical measurement periods of the plurality of second sensors; and
    determine an estimated association between the plurality of wireless sensors and the plurality of the second sensors based on the RSSI signatures.

* * * * *